(12) United States Patent
Salchert

(10) Patent No.: US 12,141,171 B2
(45) Date of Patent: Nov. 12, 2024

(54) MACHINE GENERATION OF BALANCED DIGITAL TERRITORY MAPS

(71) Applicant: XACTLY CORPORATION, San Jose, CA (US)

(72) Inventor: Andrew Salchert, Avon, CT (US)

(73) Assignee: Xactly Corporation, Los Gatos, CA (US)

( * ) Notice: Subject to any disclaimer, the term of this patent is extended or adjusted under 35 U.S.C. 154(b) by 46 days.

(21) Appl. No.: 17/325,574

(22) Filed: May 20, 2021

(65) Prior Publication Data
US 2022/0374452 A1 Nov. 24, 2022

(51) Int. Cl.
| | |
|---|---|
| G06F 16/9535 | (2019.01) |
| G06F 3/04817 | (2022.01) |
| G06F 9/50 | (2006.01) |
| G06F 16/2457 | (2019.01) |
| G06F 16/25 | (2019.01) |
| G06F 16/28 | (2019.01) |
| G06F 16/29 | (2019.01) |
| G06F 16/587 | (2019.01) |
| G06F 16/951 | (2019.01) |
| G06F 16/9536 | (2019.01) |

(Continued)

(52) U.S. Cl.
CPC ........ G06F 16/285 (2019.01); G06F 3/04817 (2013.01); G06F 9/5016 (2013.01); G06F 16/252 (2019.01); G06F 16/29 (2019.01); G06Q 30/0201 (2013.01)

(58) Field of Classification Search
CPC .. G06F 16/285; G06F 3/04817; G06F 9/5016; G06F 16/252; G06F 16/29; G06Q 30/0201; G06Q 10/063; G09B 29/007
See application file for complete search history.

(56) References Cited

U.S. PATENT DOCUMENTS

| | | | |
|---|---|---|---|
| 8,676,799 B1* | 3/2014 | Vaver | G06F 18/23213 707/736 |
| 2007/0239694 A1* | 10/2007 | Singh | G06F 16/9024 |
| 2009/0018996 A1* | 1/2009 | Hunt | G06Q 30/02 |

(Continued)

FOREIGN PATENT DOCUMENTS

KR 1020090001428 A 1/2009

OTHER PUBLICATIONS

International Searching Authority, International Search Report and Written Opinion for International Application No. PCT/US2022/029390, mailed Sep. 1, 2022, 8 pages.

(Continued)

*Primary Examiner* — Apu M Mofiz
*Assistant Examiner* — Oscar Wehovz
(74) *Attorney, Agent, or Firm* — Baker Botts L.L.P.

(57) ABSTRACT

With digitally stored geographical maps, programmed algorithms can calculate a plurality of territories within a map, the territories being balanced with respect to metric data that is associated with units of the map, using channel flow-based principles of the Constructal Law. One field of application is balanced territories for sales representatives in which units of a map are associated with different customers or entities having different sales volume, unit volume, or other workload associated with the units. As the magnitude of workload metrics changes, territories can be rapidly and efficiently rebalanced.

18 Claims, 21 Drawing Sheets

(51) Int. Cl.
*G06F 16/583* (2019.01)
*G06Q 30/0201* (2023.01)

(56) References Cited

U.S. PATENT DOCUMENTS

| | | | |
|---|---|---|---|
| 2009/0164171 A1* | 6/2009 | Wold | G06F 17/18 |
| | | | 702/179 |
| 2011/0125668 A1 | 5/2011 | Colliat et al. | |
| 2015/0242788 A1 | 8/2015 | Wu-Emmert et al. | |
| 2015/0254524 A1 | 9/2015 | Dickrell, III et al. | |
| 2017/0032390 A1 | 2/2017 | Fract | |
| 2018/0292959 A1* | 10/2018 | Erenrich | G06F 3/0484 |
| 2018/0349412 A1* | 12/2018 | Waldeck | G06Q 10/06315 |
| 2019/0318028 A1* | 10/2019 | Cao | G06Q 10/00 |
| 2020/0193459 A1* | 6/2020 | Chakraborty | G06F 18/23 |
| 2022/0082405 A1* | 3/2022 | Sumner | G01C 21/3682 |

OTHER PUBLICATIONS

Haffner, Ronald, Extended European Search Report for European patent application No. EP22805237.9, dated Jul. 29, 2024, 12 pages, published by the European Patent Office, Munich, Germany.

\* cited by examiner

| | | |
|---|---|---|
| Maximum clustering distance (miles): | 1 | —1904 |
| Maximum branches per node: | 4 | —1906 |
| Maximum levels of reach: | 5 | —1908 |
| Neighbor search depth: | 3 | —1910 |

Data Field:

| NE SchoolsS': Count Free Lunch ⌄ | —1912 |
|---|---|

| Max group data mil rate: | 50 | —1914 |
|---|---|---|

1902    Cancel    OK

FIG. 19

MACHINE GENERATION OF BALANCED DIGITAL TERRITORY MAPS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Xactly Corporation.

TECHNICAL FIELD

One technical field of the present disclosure is computer-implemented methods of generating digital maps. Another technical field is computer-implemented methods of dividing digital maps into territories.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digital maps are widely used, with the assistance of computer devices operating under stored program control, for navigation, planning, and other applications. One application of digital maps with computer support is the design and allocation of geographical regions or territories for business purposes such as recruiting or supporting customers of a business. Sales representatives are commonly assigned to defined geographical territories.

The design of sales territories has not changed for many years. Some businesses and sales reps view sales territories as "turf" that is owned and controlled, resistant to change and fearful of disruption. Sales territory boundaries are guarded and defended vigorously because the definition of territories has a material impact on the income of sales reps.

However, one law of nature is that systems of regular movement within determined channels, such as currents, when encountering multiple options, always favor the easiest or least resistant path. In a system where flow conditions are likely to change over time, currents will naturally adapt to fluctuations in resistance. When the easiest path becomes saturated, it no longer presents as the easiest path, and the overflow current will seek a more favorable alternative.

The Constructal Law describes this observation as the minimization and distribution of inefficiencies. As hypothesized by Adrian Bejan of Duke University (1996): "For a finite-size system to persist in time (to live), it must evolve in such a way that it provides easier access to the imposed currents that flow through it." If Constructal Law could be applied to the automated design of territories or other regions of digital maps, it would represent a distinct advance in the art by enabling territories to be defined in a more efficient manner based on objective computational principals rather than subjective factors such as protecting turf.

SUMMARY

The appended claims may serve as a summary of the invention.

BRIEF DESCRIPTION OF THE DRAWINGS

In the drawings:

FIG. 19 illustrates an example graphical user interface that may be used in one embodiment.

DETAILED DESCRIPTION

Figure 1:
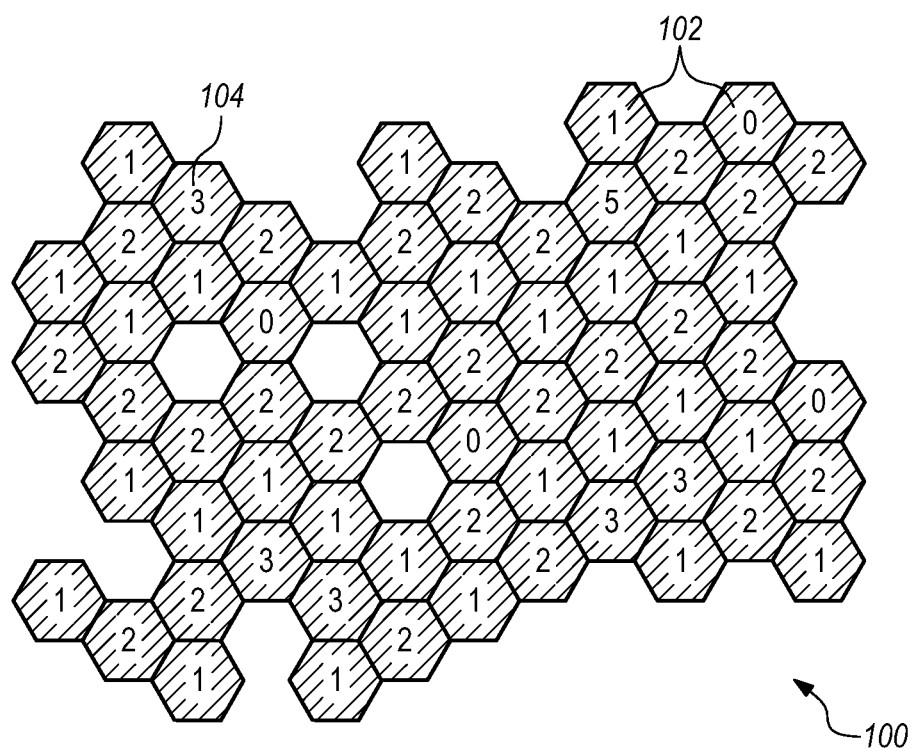
FIG. 1 illustrates an example hypothetical geographical map that can be represented in digital storage and managed by machine under stored program control.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Functional Overview—Territory Alignment Processes
2.1 Generic Digital Map Example
2.2 Specific Digital Geographic Map Example
3. Structural & Functional Overview—Computer Implementation
4. Implementation Example—Hardware Overview 1. General Overview With digitally stored geographical maps, programmed algorithms can calculate a plurality of territories within a map, the territories being balanced with respect to metric data that is associated with units of the map, using channel flow-based principles of the Constructal Law. One field of application is balanced territories for sales representatives in which units of a map are associated with different customers or entities having different sales volume, unit volume, or other workload associated with the units. As the magnitude of workload metrics changes, territories can be rapidly and efficiently rebalanced.

Embodiments provide fully automated, computer-implemented techniques to simplify territory management by defining and managing geographic territories in digital maps that can change easily as external conditions suggest. Efficient territory design is achieved by focusing on likely movement of persons or entities associated with channels or groups, and logical workload grouping. Over time, as workloads shift, dormant inefficiencies will surface and make their impact felt. Designs based on Constructal Law can mitigate these impacts with relative ease, by illuminating local paths and revealing natural solutions in real time.

In one embodiment, a data processing method is executed by a computer, the method comprising obtaining digitally stored map data that defines a plurality of geographic units, and obtaining digitally stored metric data that defines a magnitude value for each of the units; allocating array memory of the computer and digitally storing the map data in the array memory in association with the metric data; selecting, from the map data in the array memory, a plurality of geographic units as different cluster starting units; for each of the different cluster starting units, calculating one or more nearest neighbor units, determining a shortest distance between non-clustered units among the nearest neighbor units that is less than or equal to a maximum allowed distance value, marking said non-clustered units having the shortest distance for clustering, and repeating the calculating, determining, and marking until all units have been processed; based on the units marked for clustering, finding one or more shortest potential new branches that conform to a plurality of programmed constraints; defining, in the array memory, at least one channel; determining whether a particular channel can accept the one or more shortest potential new branches, and in response thereto, determining whether the channel belongs to an existing Constructal group, and in response thereto, connecting the one or more shortest potential new branches to the existing Constructal group, or if not, creating a new Constructal group and connecting the one or more shortest potential new branches to the new Constructal group; and repeating the finding, determining, and connecting until no channel can accept any branch; creating and storing, in digital data storage, territory data comprising two or more territory definitions and associating all the existing Constructal groups with one of the two or more territory definitions, the territory definitions defining balanced geographic territories in the geographical map; each of the nearest neighbor units, cluster starting units, branches, channels, and groups being stored in the array memory; programmatically transmitting the territory data to one or more of a set of presentation instructions and an external application computer.

In one feature, each element of the array memory stores, for a given unit: a data metric value of the unit; a sub-array of indices for units branching from the unit; a channel value comprising the index of a parent unit from which the unit branches; a cluster queen value comprising the index of the unit at a head of a cluster grouping that includes the unit; a Constructal group assignment value; a branching level value; a cluster queen flag value.

In another feature, the plurality of programmed constraints comprises: Do not consider, as a potential branch, any unit that already has an assigned channel unit; Consider all nearest neighbors, up to the maximum allowed distance value, as potential channel unit candidates; Ignore units with an assigned cluster queen value, for potential branches and channels; Disqualify any potential connection of a branch and channel that would result in a unit level value that exceeds a maximum allowed unit level value, but any zero-level unit may be considered as a potential branch for a neighboring channel, including a base unit for another Constructal group; Disqualify any potential channel having a specified maximum allowed number of branches; Disqualify any potential channel that branches from the potential branch; Disqualify any connection of a branch and channel that would result in a group data total that exceeds a specified maximum allowed group data total.

In another feature, the method further comprises obtaining, via input using a widget of a graphical user interface, all of the maximum allowed distance value; the maximum allowed unit level value; the maximum allowed number of branches; and the maximum allowed group data total; and using, in the steps of claim 1, the maximum allowed distance value, the maximum allowed unit level value, the maximum allowed number of branches, and the maximum allowed group data total that were obtained via input using a widget of a graphical user interface.

In yet another feature, the digitally stored map data represents a plurality of different Zip code values corresponding to a plurality of United States Zip codes; and the digitally stored metric data specifying a plurality of integer data values, each of the integer data values corresponding to one of the different Zip code values, each of the integer data values specifying a number of business entities of a specified type that are within the corresponding Zip codes.

In a further feature, the method may further comprise causing generating a digital graphical visual display of the territory data on a display device of a user computer that is communicatively coupled via a network. In yet another feature, the territory definitions of the territory data are each associated with a different set of one or more identifiers of incentive compensated sales representatives, the method further comprising transmitting the territory data to an incentive sales calculation application.

2. Functional Overview—Territory Alignment Processes

Present sales territory design involves inefficiency in many forms. Examples include natural barriers in the physical terrain in which representatives work and irregular distribution of opportunities present difficulties; personal connections or preferences of the individual representatives also introduce inefficiencies. The standard method for correcting inefficiencies in sales territory alignments is the regularly scheduled realignment project, which usually takes place once annually or bi-annually. Unlike past approaches, the present disclosure builds flexibility into the system aimed at reducing the impact of inefficiencies in real time.

2.1 Generic Digital Map Example

FIG. 1 illustrates an example hypothetical geographical map that can be represented in digital storage and managed by machine under stored program control. FIG. 1 shows a digital map 100 comprising sixty-four hexagonal cells 102 each having a metric value 104. The total of all the metric values is one hundred. Let the value 104 for each cell 102 represent an index for, or percentage of, overall expected activity or anticipated workload associated with the cell. In different embodiments or domains, data values may represent different physical or computational factors or metrics. Examples include number of customers or accounts, number of product installations, number of business entities, or population. The analysis method of the present disclosure functions with any chosen metric that conveys meaning to the user.

Figure 2:
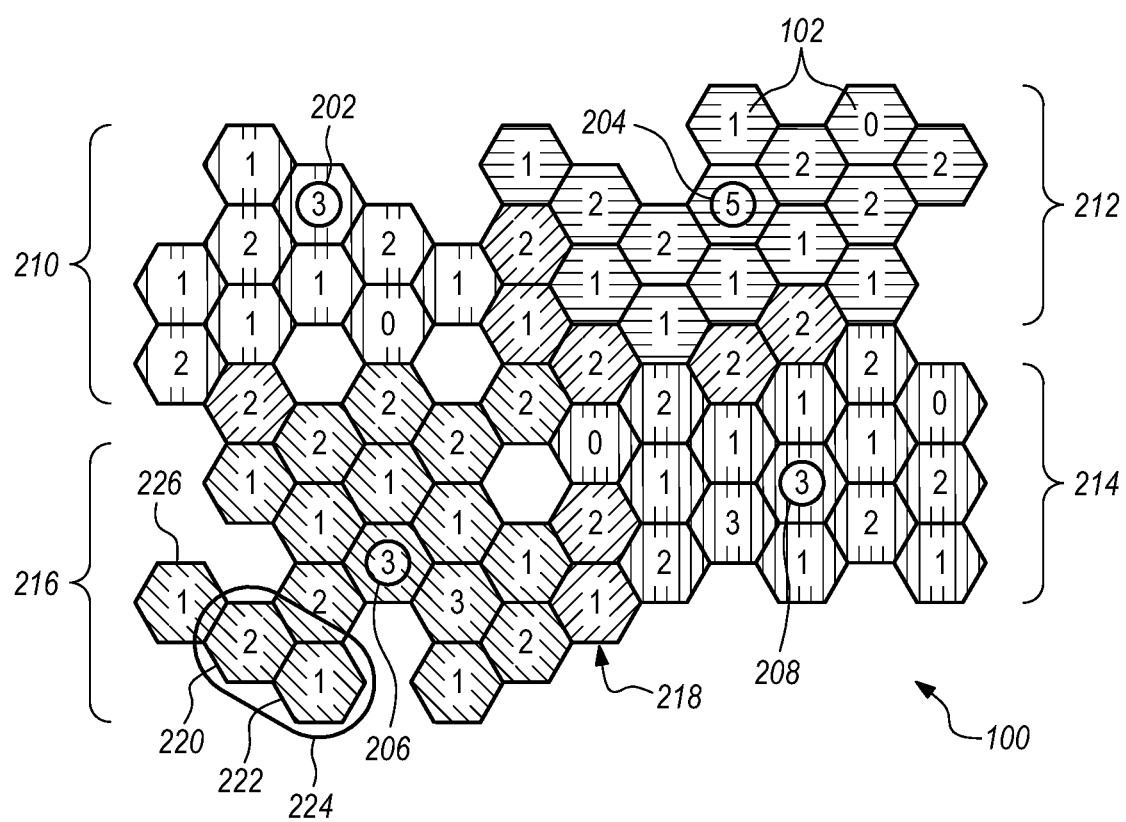
FIG. 2 illustrates the map of FIG. 1 in which the high-valued cells are circled.

Assume that the map of FIG. 1 is to be divided into four (4) territories that are associated with entities or representatives A, B, C, D. Each of A, B, C, D is assigned to a relatively high-valued cell in each of four (4) quadrants of the map. FIG. 2 illustrates the map of FIG. 1 in which the high-valued cells are circled. Four high-value cells 202, 204, 206, 208 are defined. In one embodiment, four (4) initial territory definitions 210, 212, 214, 216 are assigned, each including only cells for which the assigned entity is closer than any other entity, assuming the distance between all adjacent cells is the same. In this context, "closer" means fewer cells to travel. FIG. 2 represents an efficient territory alignment, if travel or distance is the sole criterion for determining efficiency. The hatched cells 218 are those which can be served by two or more reps with equal efficiency, which means they are as-yet undecided or unassigned.

The territory 216 in the lower left part of FIG. 2 covers a total value of "28". To achieve territories that are balanced by a total data value of "25", some cells should be removed from the lower-left territory 216 and assigned to another. Such a reassignment reduces efficiency, so an important question is which cells should be given up. Random selection or manual adjustment to achieve visual balance may be used in various embodiments. While this process is viable, it may be vulnerable to irrational reliance on visual patterns or the assumption that numerical balance is correct. These are inherent biases in prior approaches. In an embodiment, a computer-implemented process is programmed to suggest the most logical moves for realignment. Specifically, an automated territory alignment process based on Constructal Law can remove error introduced by human biases or a preconceived sense of order; instead, the cells or data points determine where each point is most inclined to flow, or which points naturally connect to each other and promote ease of access within the territories.

These principles can be applied to the hypothetical map of FIG. 1, FIG. 2 first by working from the outside, inward and then from the inside, outward. In an embodiment, processing steps ensure a balanced distribution of inefficiencies, avoiding situations where any one channel dominates its neighbors; lighter loads are favored over heavier ones when accumulating data points.

In an embodiment, cumulative flow calculations form the basis of decisions on whether to move a point to a different territory. In this context, "data point" or "point" may refer to a cell. If a point 220 with value two is connected to a point 222 with value one, then the flow within the channel 224 comprising the two points is three. If the channel 224 is then extended to another point 226 with value one, the channel flow value of the channel is four. Embodiments are programmed to keep all channels relatively balanced in terms of the number of units or the magnitude of the flow values. For example, in an embodiment, a channel flow value for a particular channel is added to a cumulative flow value for one territory among a plurality of territories. The extension of a channel is constrained to seek the lowest data accumulation. At each step in the foregoing process, among all potential moves or assignments of an unassigned cell to a channel, the process is programmed to select the move that results in the lowest data accumulation. For example, in FIG. 2, if cell 226 is channeled to cell 220, creating an accumulation of three (one plus two), that channel cannot be extended until there are no other potential accumulations of three or less to be obtained elsewhere. Exceeding the accumulations of other channels is allowed, provided no other moves with less impact are available. The foregoing process iterates until all cells have been assigned to a territory.

Figure 3:
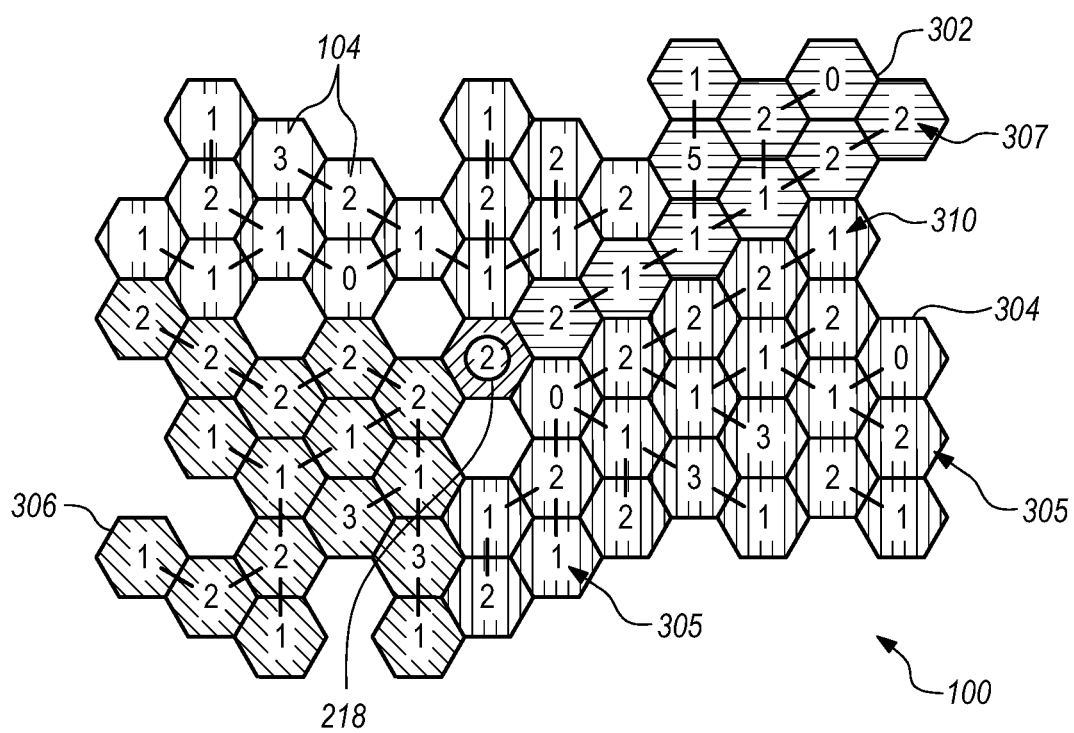
FIG. 3 illustrates the map of FIG. 1, FIG. 2 after working from the outside, inward toward the center.

FIG. 3 illustrates the map of FIG. 1, FIG. 2 after working from the outside, inward toward the center. The territory 302 at upper right represents a channel 307 totaling "17", while the territory 304 at lower right represents a confluence of channels 305 totaling "33". Consequently, at this stage, the distribution of metric values 104 across the map as a whole did not permit maintaining balance among the channels 305, 307. However, the branching within each channel 305, 307 gives a clear indication of how to divert the flows to achieve greater balance. If the top-most branch 310 in the lower-right territory 304 (having values of 2-2-2-1 angling up to the right, running adjacent to the lower-most channel of the upper-right territory) is assigned to the upper-right territory 302, then territories 302, 304 have nearly perfect balance with cumulative flow values of "24" and "26". By using flow analysis in this manner, the digital map suggests the solution.

Figure 4:
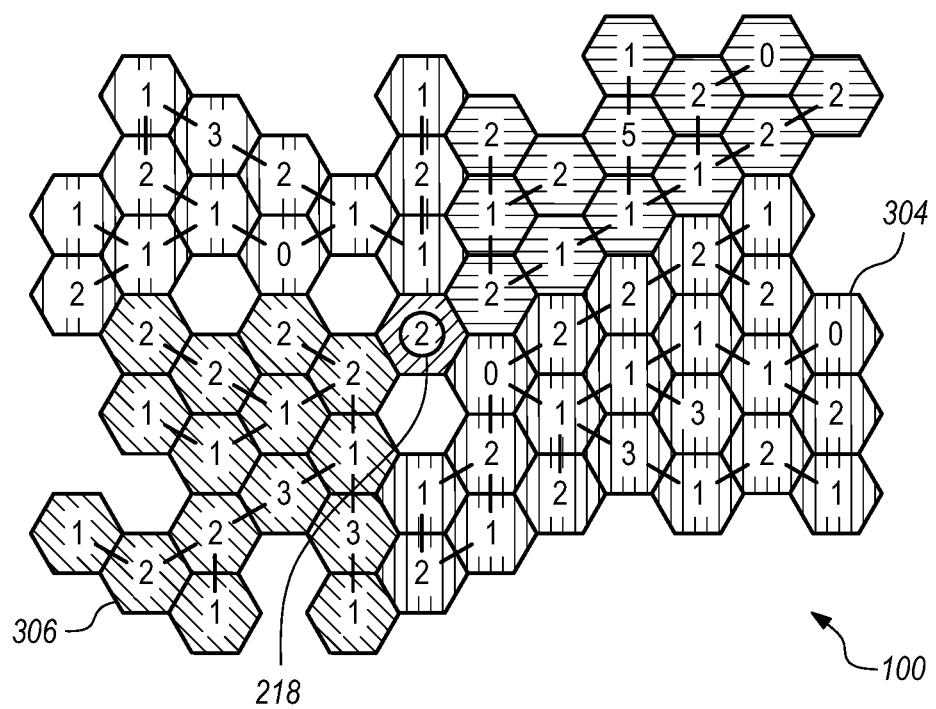
FIG. 4 illustrates the digital map of FIG. 3 after processing from center outward.

In an embodiment, FIG. 3 is an intermediate result and is processed from the center of the digital map, working outward. FIG. 4 illustrates the digital map of FIG. 3 after processing from center outward. In FIG. 4, the lower-right territory 304 has an arrangement identical to that of FIG. 3, and the lower-left territory 306 in FIG. 4 differs from FIG. 3 only by one cell. Applying flow analysis to territory alignment allows logical options to modify and correct natural delineations and inefficiencies or imbalances inherent to the digital map by overriding the natural paths.

Identifying an accurate representation of the flow within the system is a foundation to applied flow analysis in aligning territories in digital maps. The examples of FIG. 1, FIG. 2, FIG. 3, FIG. 4 are workable for territories that are served in long journeys originating from the center of the territory to a point in an outer area of the territory. In some instances, territories are not served in this manner; instead, a worker will focus on a subsection of the territory and visit points of contact in a general area over a short focus period of five days or less. The worker may make a single long trip to reach the area of focus, conduct several days of local excursions, then make a long return trip. For the next trip, the worker will focus on another subsection, and so on, generating a cyclical pattern of activity. This segregated subgroup flow system makes the whole territory easier to manage and less costly to cover.

Figure 5:
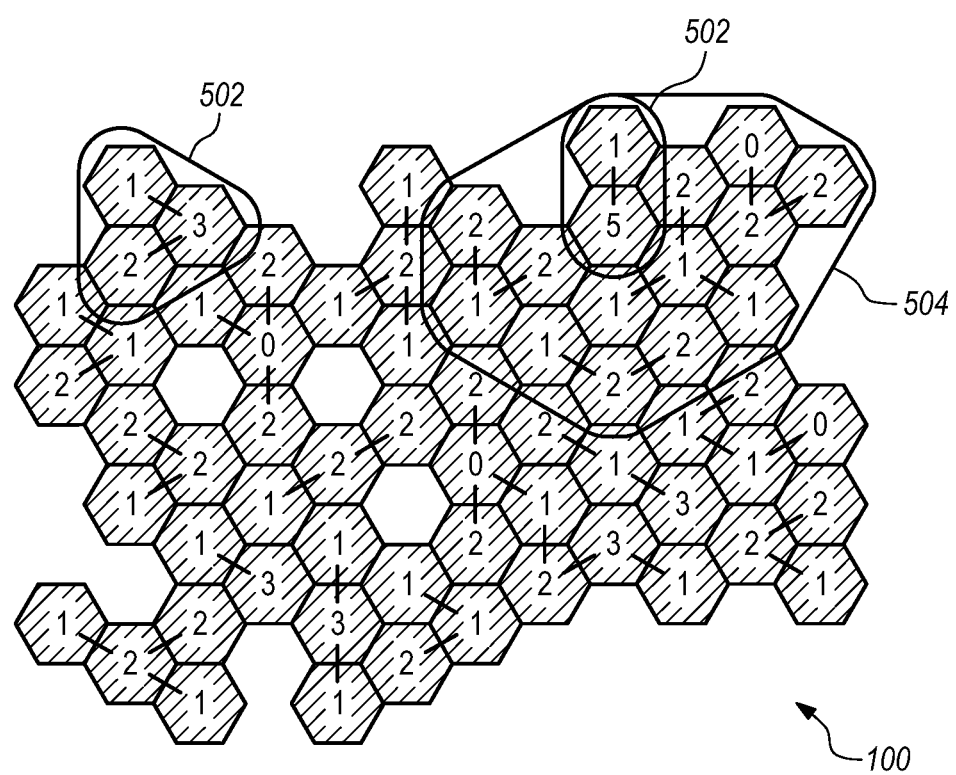
FIG. 5 illustrates the map of FIG. 1 in which cells have been connected in discrete sections of a specified range of sizes.

The flow of information and persuasive endeavors in such modern contexts, where long distance travel is not much of a constraint, suggests that territories in digital maps ought to be viewed from a perspective of local groupings, rather than extended flow channels. In an embodiment, a Constructal Law approach eliminates central, longer channels. In one embodiment, neighboring cells of a digital map are connected into sections of four to six in total value, but the values four to six are used merely to illustrate a clear example and other embodiments may be connected in sections having total values that are different. The range of four to six could constitute a week's worth of work, but other embodiments may use other total values or other ranges. FIG. 5 illustrates the map of FIG. 1 in which cells have been connected in discrete sections of a specified range of sizes. In an embodiment, FIG. 5 is generated by working from the outside, inward; inefficiencies in the map are corralled in the center and then can be addressed as a single large group. Working from the center, outward, has been found in experiments to cause inefficiencies to be isolated and trapped.

Figure 6:
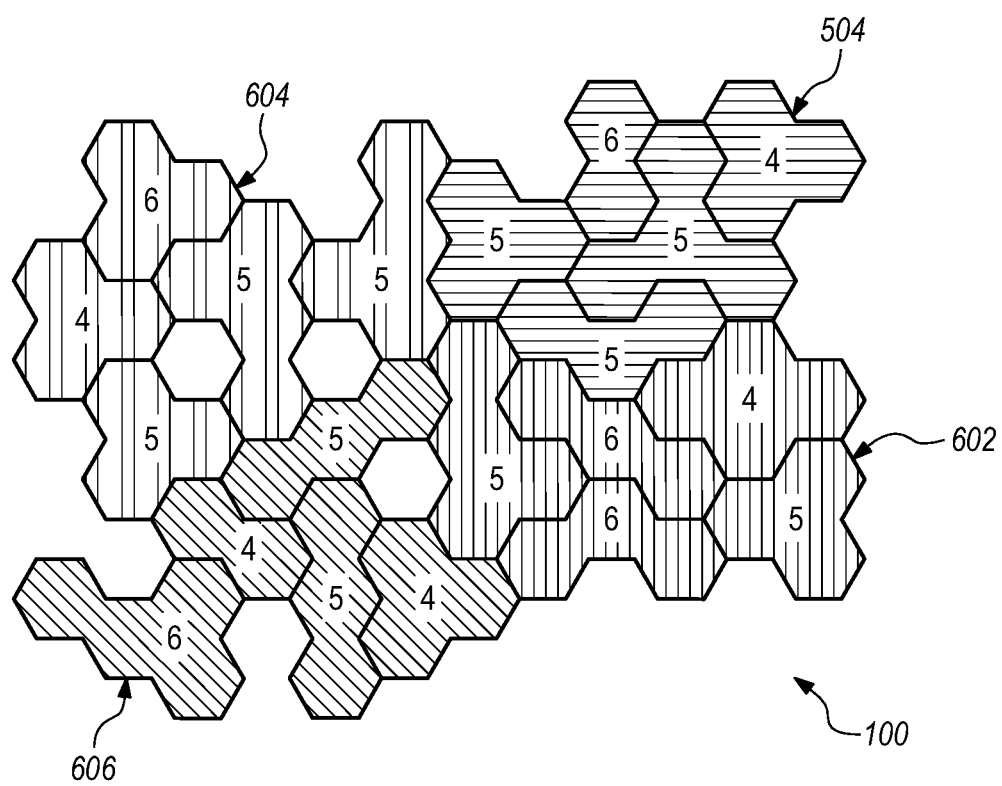
FIG. 6 illustrates the map of FIG. 5 after assigning territories based on connected sections of cells.

The example of FIG. 5 results in forming twenty connected sections 502 of cells of which two are identified with reference numerals. Each of the sections 502 can be viewed as a small territory with no extended channeling. Each of the four entities can be assigned five sections 502, which collectively form a territory. FIG. 6 illustrates the map of FIG. 5 after assigning four territories 504, 602, 604, 606 based on connected sections of cells. The example of FIG. 6 shows, via simplified spatial relationships and patterns, that efficiency has improved through adaptable paths of flow based on the Constructal Law.

In some embodiments, the process of aligning territories may further comprise identifying center cells within the cell sections that were combined to form each territory of FIG. 6. In this context, the center cell may serve as a temporary base for initiating operations within the territory. In some embodiments, the center cell may relate to an airport, hotel, or local office. The center cell need not be the entity locations that were first assigned in connection with FIG. 1. Since travel has become relatively easy, embodiments do not need to be programmed to locate entities at a central position within the territory. If constraints apply, such as only local travel is permitted, then the process may be modified to associate entities with a central position.

The relationships among section centers may support action within more compact units of a territory. Local travel within each section can be managed and optimized individually, while longer travel between section centers expresses the territory as a whole and determines its travel demands and expenses. Thus, a territory is efficiently designed when its section centers are relatively close to each other, provided all of the sections are reasonably compact, themselves. Outliers, being accounts or remote areas isolated at a considerable distance from all other points, should be managed separately.

Figure 7:
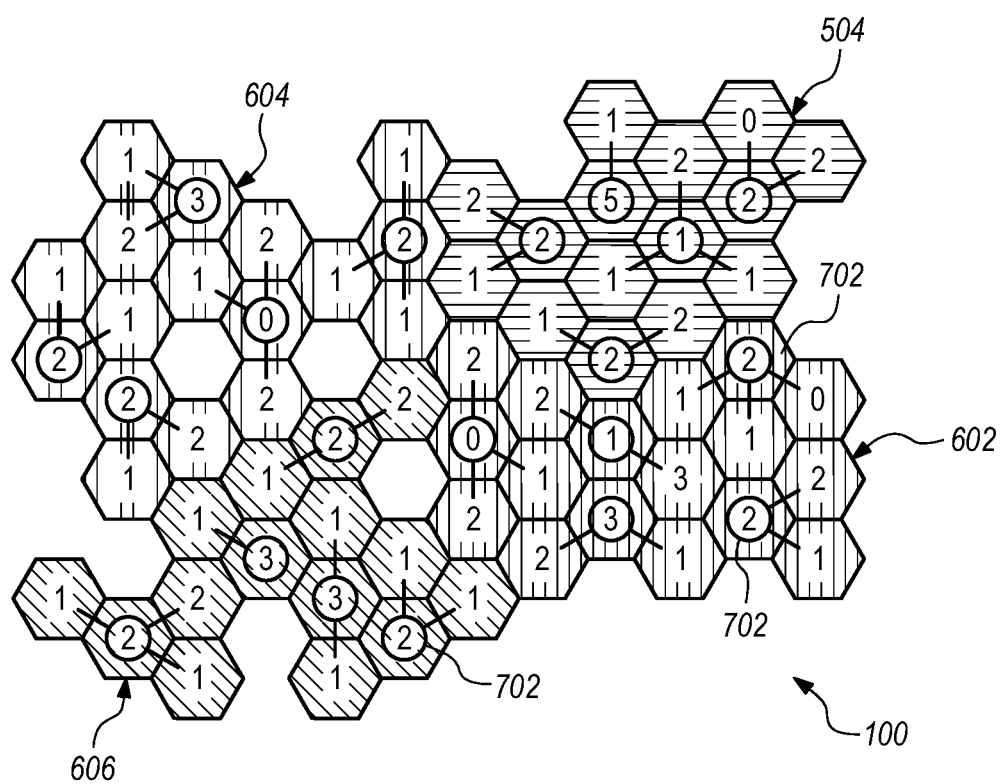
FIG. 7 illustrates the map of FIG. 5, FIG. 6 with circles denoting twenty section centers.

FIG. 7 illustrates the map of FIG. 5, FIG. 6 with circles denoting twenty section centers. Three section centers 702 among the twenty are identified with reference numerals, as examples. The relative compactness of each territory may be measured by calculating the least cumulative distance or travel from any one section center 702 to the other four, allowing air travel over white space:

Upper-left Territory 604=2+2+2+3=9
Upper-right Territory 504=1+1+2+2=6
Lower-left Territory 606=1+1+2+3=7
Lower-right territory 602=1+2+2+2=7

Therefore, the upper-right territory 504 is the most compactly constructed of the four. Long hauls between subsection centers are few in number. The upper-left territory 604, on the other hand, is relatively non-compact, with large distances to travel between subsection centers.

Figure 8:
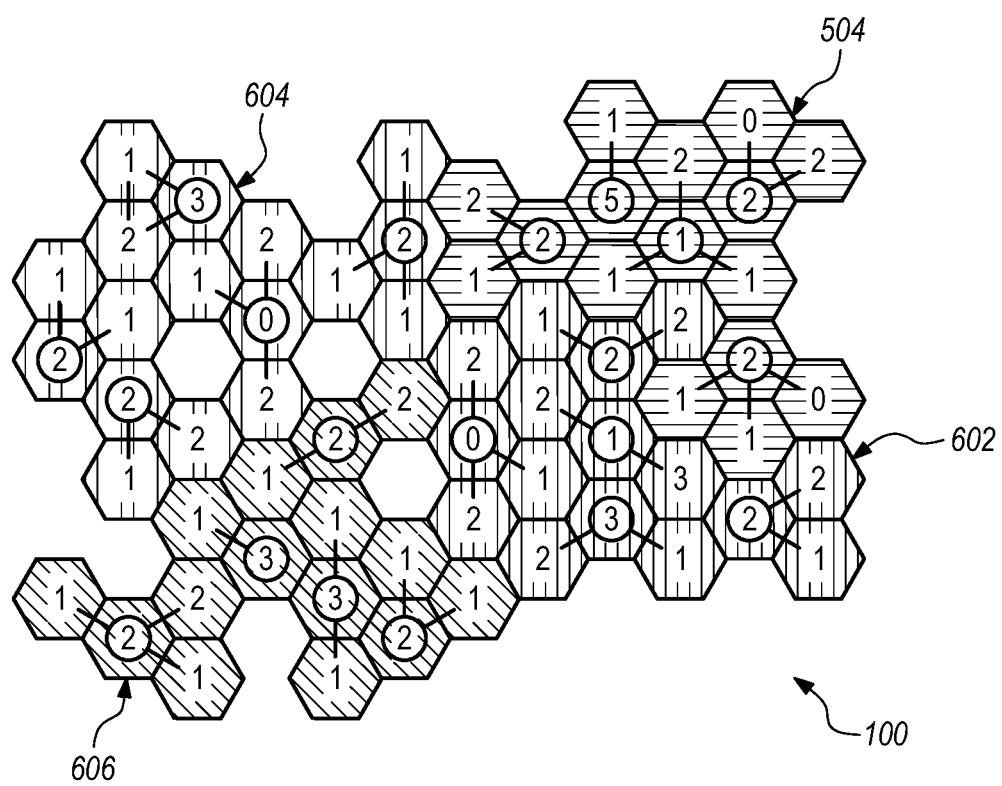
FIG. 8 illustrates the map of FIG. 7 after applying an optimization step.

In an embodiment, an optimization step may be executed to scan for possible improvements to the alignment. Optimization may be programmed as a balanced tradeoff between neighboring territories. The sections should remain intact, and the territories' cumulative values should remain relatively equal. In an embodiment, imbalance could be allowed optionally if an improvement in efficiency would be achieved. FIG. 8 illustrates the map of FIG. 7 after applying an optimization step. In the embodiment of FIG. 8, one section of the lower-right territory 602 has been shifted to the upper-right territory 504. The upper-right territory 504 continues to have a long-haul total of six, while the lower-right territory 602 has a long-haul total that drops from seven to six. Visually, these two territories 504, 602 may look worse, but only due to human aesthetic bias. There is nothing inherently inefficient about the revised territory shapes, from a Constructal flow perspective. Applying optimization to the left-side territories 604, 606 will not yield an improvement without worsening the efficiency of the overall alignment of all territories.

A key principle of the Constructal Law is that a territory alignment must be able to evolve and provide easier access to the currents flowing within it. When the currents change, either in volume or direction or capacity, the territory alignment must adapt or be modified to accommodate the change. In the context of a sales-based business, changes in currents could comprise closing new transactions, the failure of renewals to occur, or other changes in demands or opportunities. The digital maps produced by embodiments herein facilitate ongoing management. As noted for FIG. 6, FIG. 7, subsections in each territory have four to six points in total value. If a new transaction results in a particular subsection exceeding a value of six, in an embodiment, the process is programmed to generate an alert specifying that the change may have introduced future inefficiency into the territory alignment. In practical terms, for a sales-based organization, the rep associated with the territory will either have to work overtime in this section, or some part of the section may suffer failure under the increased demands.

Figure 9:
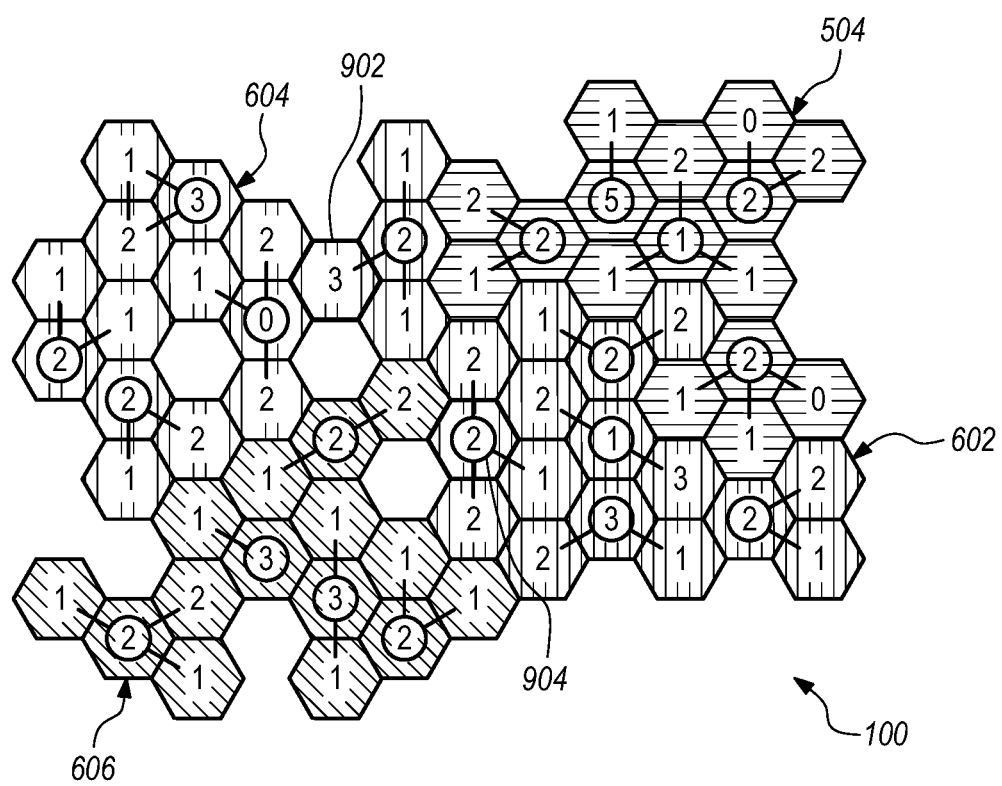
FIG. 9 illustrates the map of FIG. 8 after updating in response to changes in channel flows.

In an embodiment, local modifications can be made in real time, to ensure that the constraints are respected, and the inefficiencies are distributed. FIG. 9 illustrates the map of FIG. 8 after updating in response to changes in channel flows. Each of cells 902, 904 in both the territories 602, 604, respectively each reflect an increase of two in value. Each changed section now contains a total value of seven, which exceeds the constraint for workability. In one context of use, the respective sales rep who has closed each of these new deals understandably deserves to benefit from the effort. However, from an overall business perspective, new inefficiencies are likely to result from the oversized sections.

Figure 10:
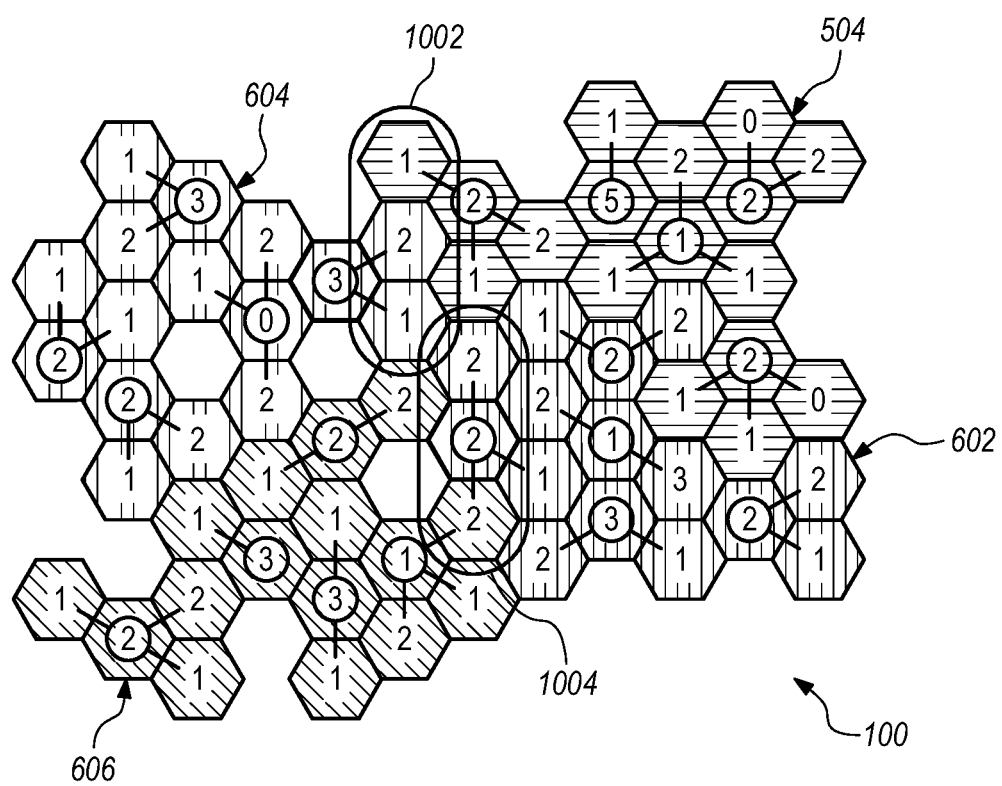
FIG. 10 illustrates the map of FIG. 8, FIG. 9 after updating to modify sections.

In past approaches, these inefficiencies would have been ignored for up to a year until the next territory realignment exercise. In an embodiment, changes in current flows based on transaction alerts can be resolved in real time by reducing an affected section to a manageable size and joining portions of the section to neighboring sections. FIG. 10 illustrates the map of FIG. 8, FIG. 9 after updating to modify sections.

Sections 1002, 1004 have been modified by designating a center unit or by changing territory measurement. In some situations, the absorption can be managed by the same territory, resulting in no real loss. For FIG. 8, FIG. 9, a neighboring territory must receive a portion of a section. Of course, these changes can be executed whenever and however a user, or business entity needs the changes. Unlike past approaches, the present process enables an administrative user or account to promptly receive an alert, notification, or visualization of the impact on territory efficiency.

2.2 Specific Digital Geographic Map Example

Figure 11:
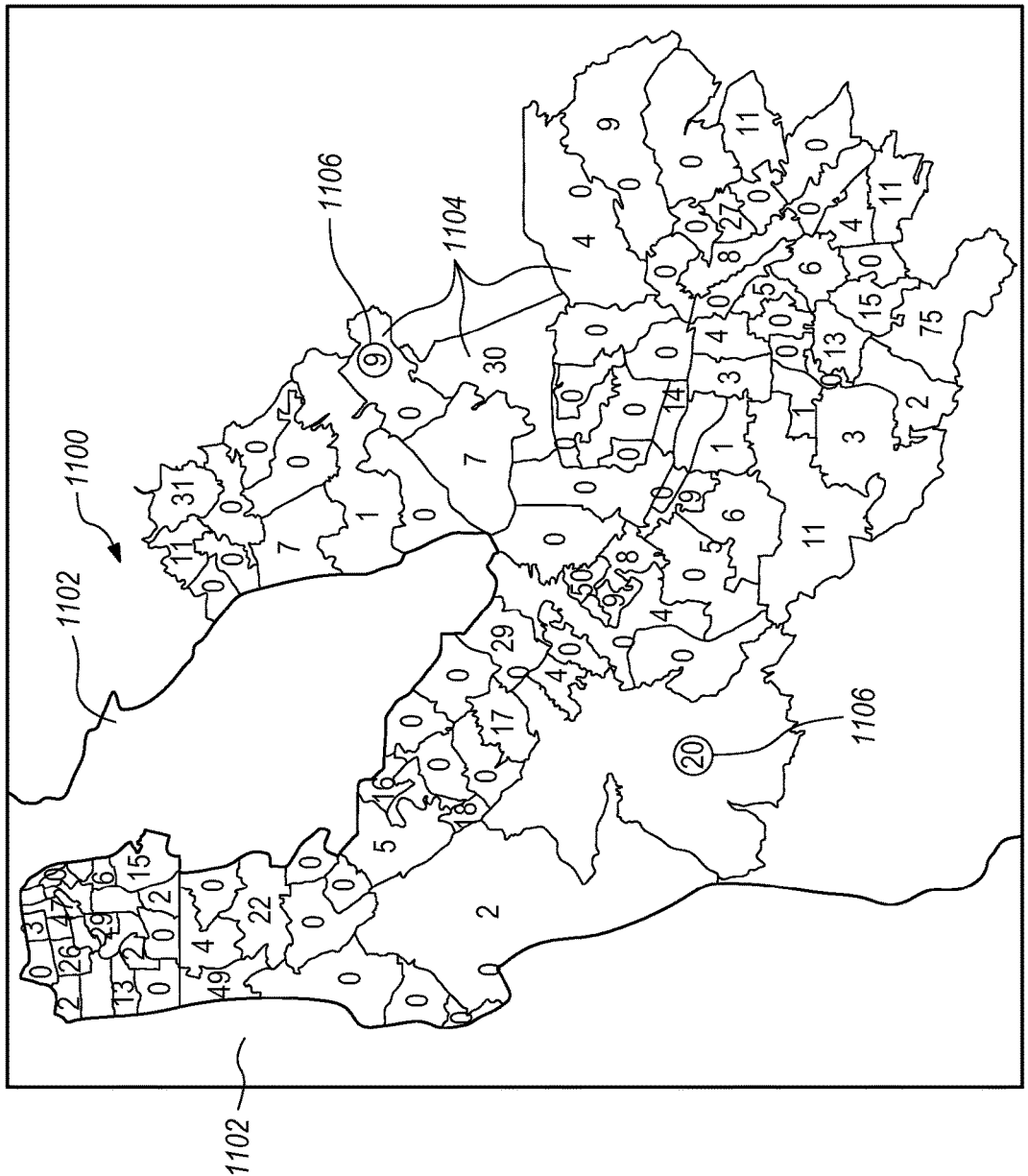
FIG. 11 illustrates a digital map of the San Francisco Bay area marked with boundaries of Zip codes.

The techniques of embodiments may be understood further with reference to an alignment problem based on five-digit Zip codes of the United States of America, focusing on codes and regions of the San Francisco Bay area. FIG. 11 illustrates a digital map of the San Francisco Bay area marked with boundaries of Zip codes. In the example of FIG. 11, a visual rendering 1100 of a digital map comprises irregular polygons 1102 representing areas of water, and a plurality of irregular polygons 1104 representing Zip codes within potential territories. Each polygon 1104 is labeled with a numeric value 1106 having a magnitude, in this example based on the prescription-writing activity of certain physicians in each Zip Code. The sum of values of all regions for Zip codes shown in FIG. 11 is "1200," which is divisible by both three and four. For purposes of illustrating a clear example, assume that the territory alignment task requiring a machine solution is to assign the Zip codes regions of FIG. 11 among either three or four entities or sales reps. Embodiments also can be used to determine if there is a better way to align an existing set of sales reps or entities.

Figure 12:
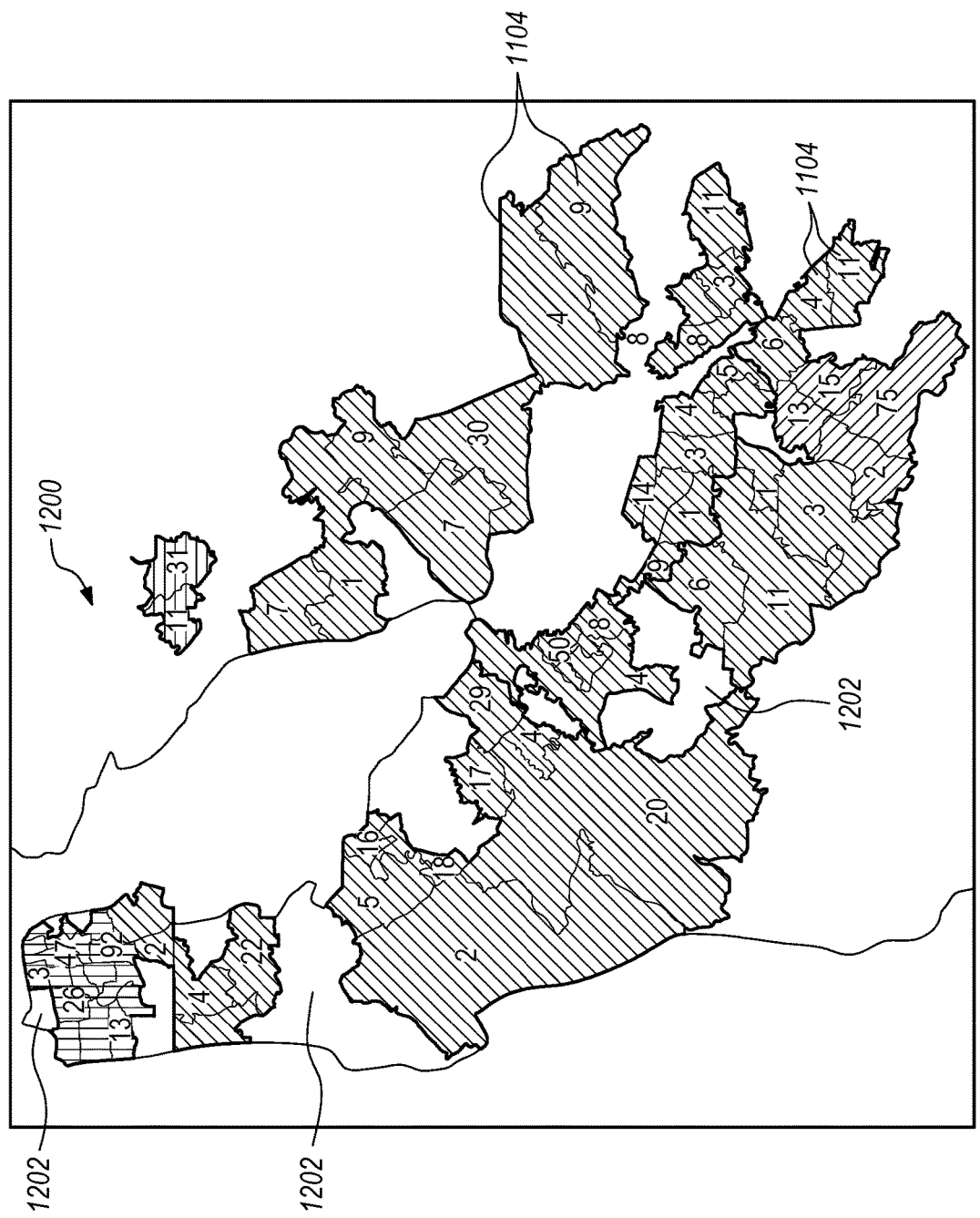
FIG. 12 illustrates the digital map of FIG. 11 in which regions with zero data are hidden.

In one embodiment, an optional first process step is to simplify the problem domain by hiding Zip codes or regions with zero data and choosing starting points for further machine analysis, but other embodiments may be programmed to process regions with zero values like any other. FIG. 12 illustrates the digital map of FIG. 11 in which regions with zero data are hidden. In the example of FIG. 12, an updated rendering 1200 shows the same map as in FIG. 11 but comprises a plurality of regions 1202 of one or more Zip codes with zero data values, rendered in white or another color to indicate that they are hidden. In an embodiment, starting points are chosen to meet a criterion of mutual separation. As large-scale delineations of territories are formed, embodiments execute most efficiently when paths are separated for as long as possible. If many assignments are defined before paths collide, then fewer conflicts need resolution later. In one embodiment, at least two starting points are selected, one at each far end of the problem space. The example of FIG. 12 illustrates three logical points.

Figure 13:
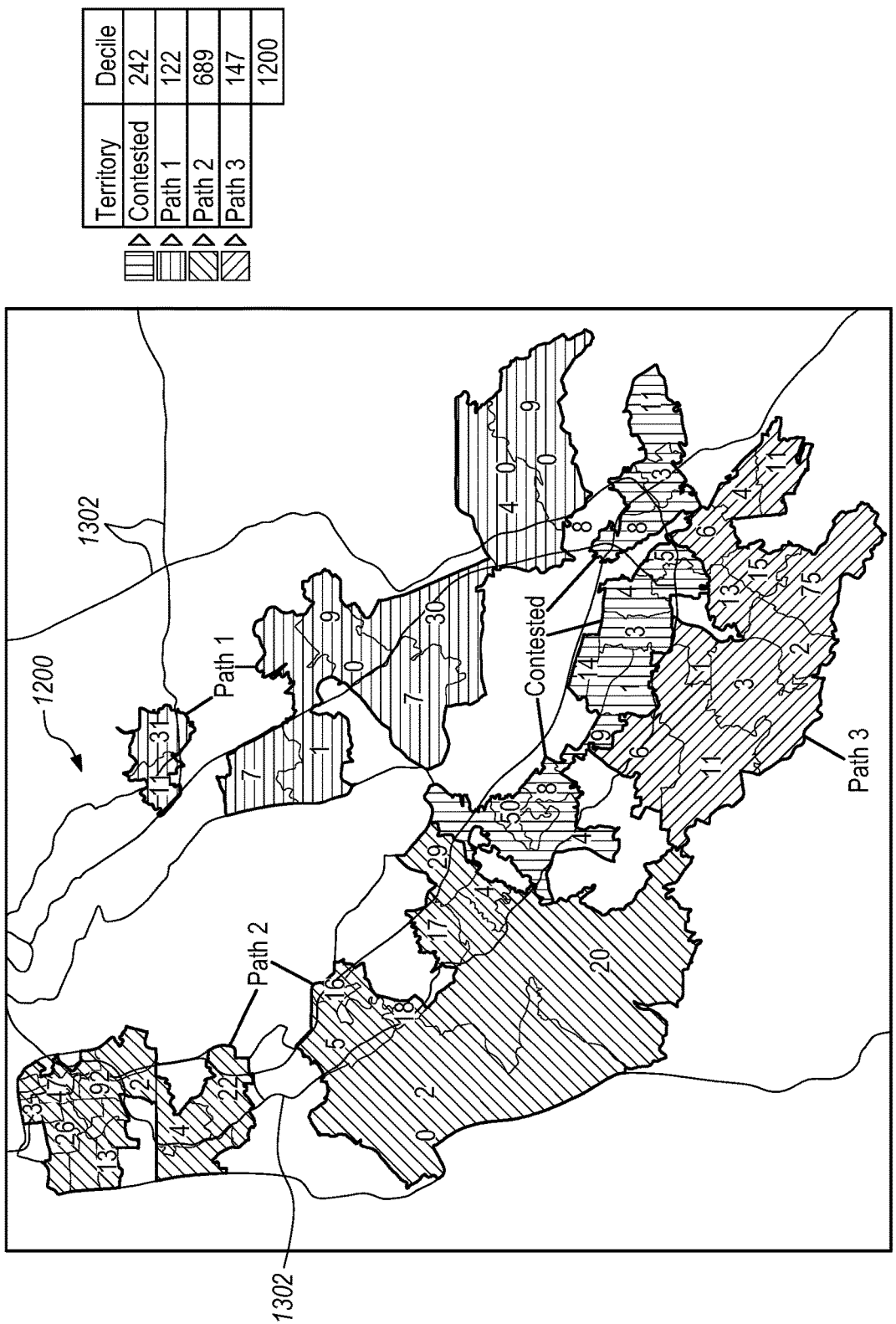
FIG. 13 illustrates the digital map of FIG. 12 in which major roads are shown.

In an embodiment, individual base units corresponding to polygons 1104, such as Zip codes in the case of FIG. 11, FIG. 12, are assigned to each of the starting paths, based on proximity or ease of access, stopping when the remainder of the problem represents contested areas which could be covered equally efficiently by more than one path. In an embodiment, decision making may be improved by adding representations of major roads to the digital map, to show where vehicle access between base units is easiest. FIG. 13 illustrates the digital map of FIG. 12 in which major roads are shown. The rendering 1200 of FIG. 12 includes a plurality of visually rendered lines 1302 representing roads. In other embodiments, other forms of transportation can be represented in the digital map and used, such as paths used by transit systems such as subway, underground, light rail or heavy rail. Representations of transportation, as in FIG. 13 can inform path selection.

In an embodiment, a next process step is to divide the larger data collections to achieve a plurality of manageable values among various paths. Manageable, in this context, means small enough to provide multiple options for combining. Territories will be formed from the paths. While dividing the data collections, the process ensures that ease of access within each path, rather than between paths, is the primary factor in determining whether to group base units. For example, the fact that one of the paths far outweighs the others, in total value, may not be a problem since balancing the paths is not a goal; defining natural delineations for ease of access is a goal of embodiments.

Figure 14:
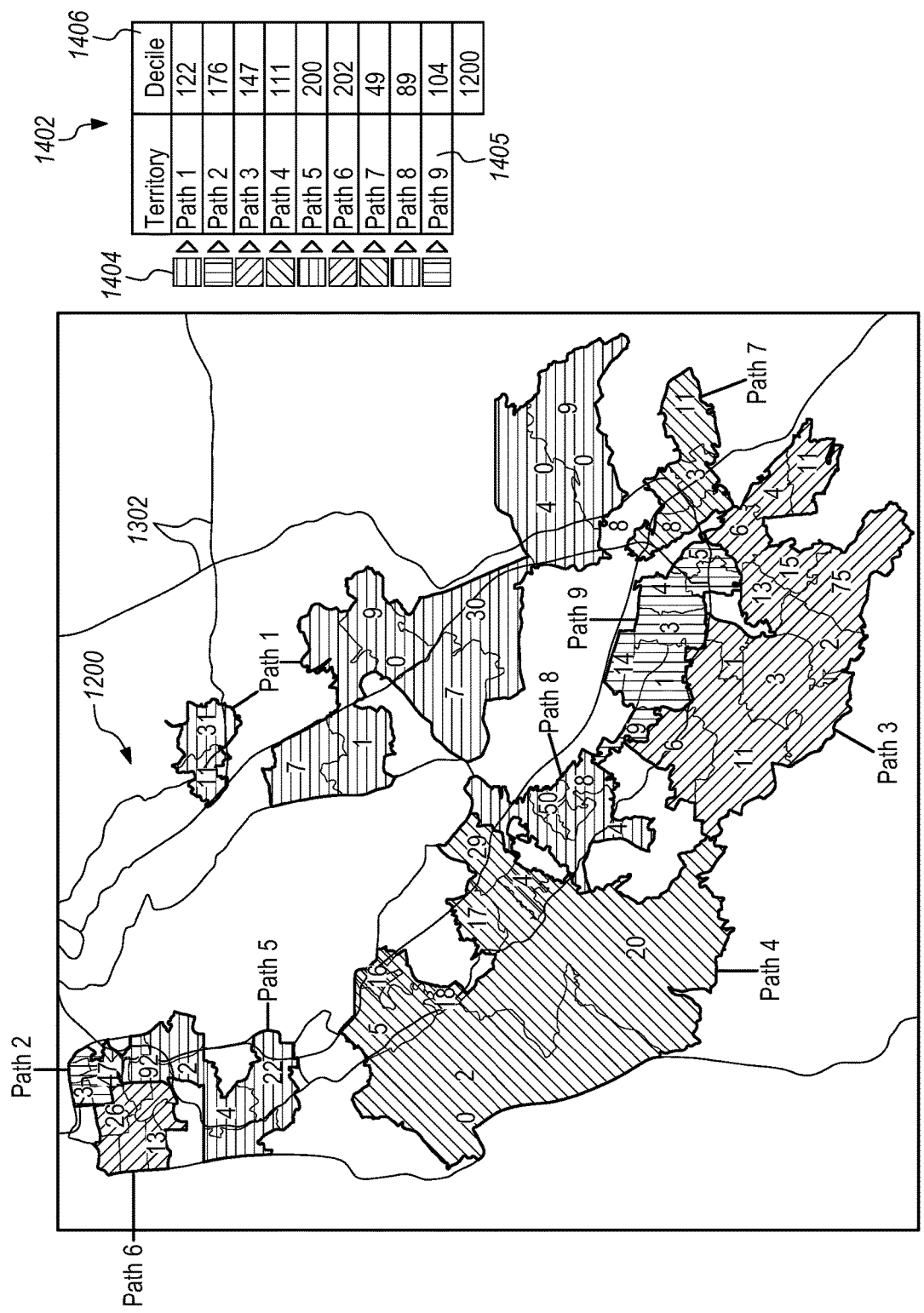
FIG. 14 illustrates the digital map divided into nine logical paths.

FIG. 14 illustrates the digital map divided into nine logical paths. In an embodiment, rendering 1200 is updated, in FIG. 14, to include coded representations of paths; a key table 1402 is visually displayed near the map and comprises a key column 1404 of matching key values corresponding to paths, a territory column 1405 identifying path names or numbers, and a decile column 1406 specifying corresponding sums of units on each path. Each path identified in column 1405 now contains fewer than the maximum sum of data values that has been defined, which is "300" for four territories or "400" for three territories, as indicated in column 1406. Therefore, a next step is to combine the paths into three or four balanced territories. With only nine paths, options may be too limited. To enable reassignment of paths to resolve a conflict between territories, sections with smaller total impact are better to use. Various embodiments may use various numbers or thresholds. In one embodiment, the majority of paths should contain no more than 25% of a planned total value for a territory. Three paths per channel or four paths per channel is often seen in experimental execution. These paths may be divided into smaller groupings based upon topography.

Figure 15:
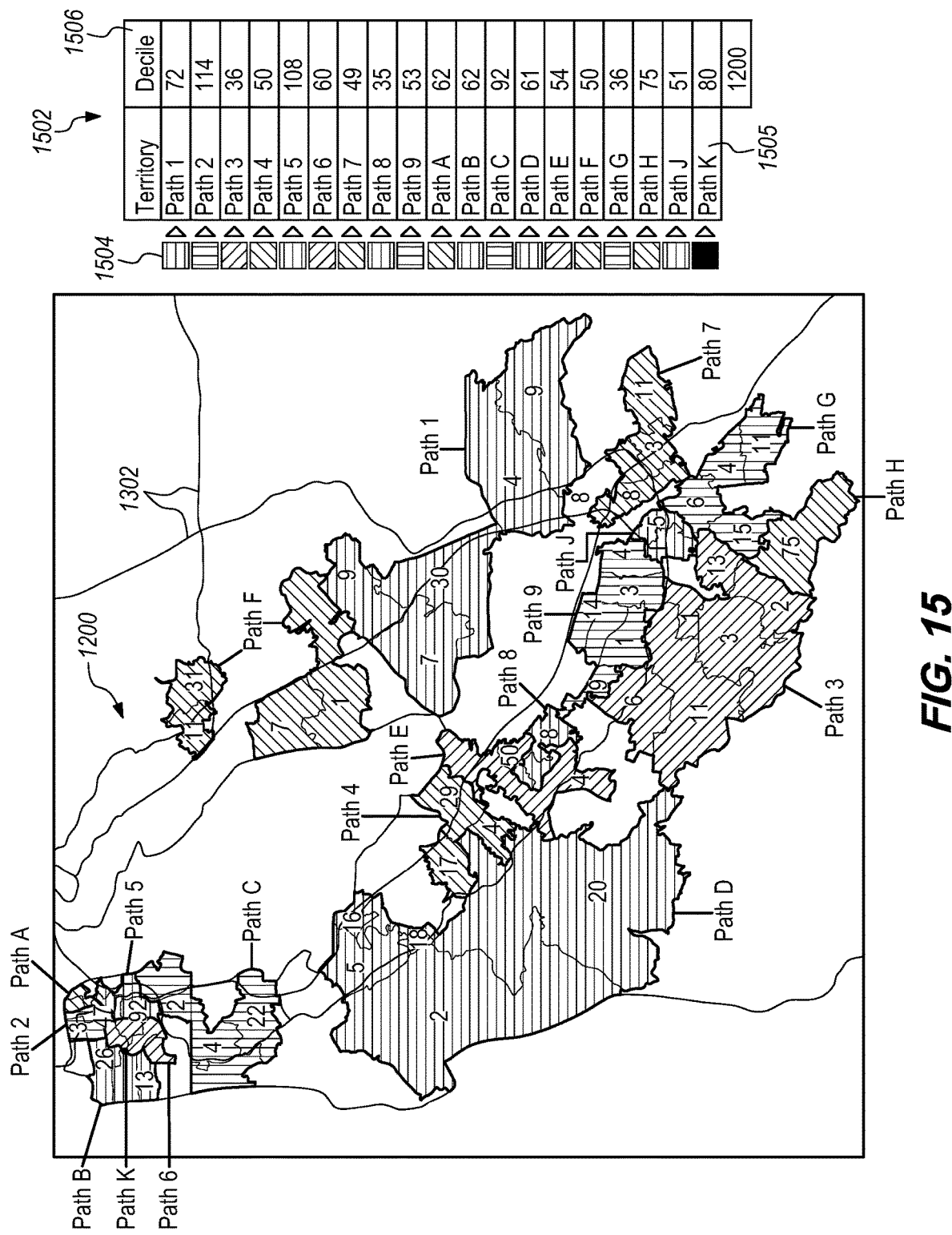
FIG. 15 illustrates the digital map of FIG. 14 with nineteen paths from which to create territories.

FIG. 15 illustrates the digital map of FIG. 14 with nineteen paths from which to create territories. In an embodiment, rendering 1200 is updated, in FIG. 15, to include coded representations of paths; a key table 1502 is visually displayed near the map and comprises a key column 1504 of matching key values corresponding to paths, a territory column 1505 identifying path names or numbers, and a decile column 1506 specifying corresponding sums of units on each path. Key column 1504 will be seen to define nineteen different paths according to different colors or other coding. Each territory will comprise at least three subsections or paths. In an embodiment, territory formation then proceeds automatically, and assigning the new paths to territories is a task of far less complexity than when individual Zip codes were under consideration (FIG. 11). In an embodiment, balanced territories are formed based on the paths. In an embodiment, the goal of balance may be overridden; for example, a configuration file may store data specifying an override value. Override signals may be provided during a configuration stage before territory alignment starts. In an embodiment, when territories are formed path or section definitions are maintained for use in feedback analysis and in managing reassignments to address future or later local needs.

Embodiments may be programmed to enable a territory alignment to change immediately or in real time as data values or other conditions change.

Figure 16:
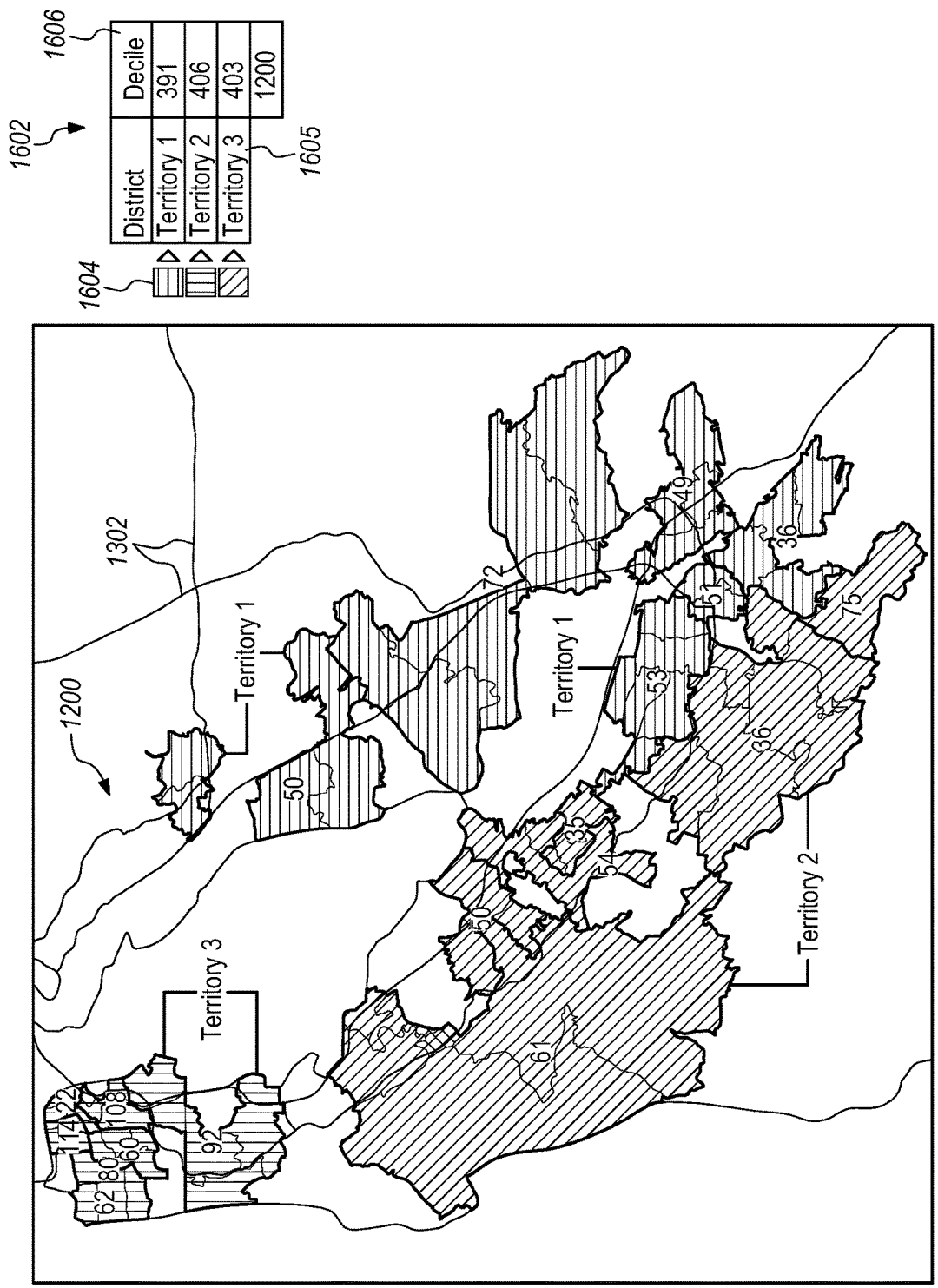
FIG. 16 illustrates the digital map of FIG. 15 in which three territories are defined.

Based on the nineteen paths of FIG. 15, alignments or solutions having three territories or four territories may be formed. FIG. 16 illustrates the digital map of FIG. 15 in which three territories are defined. In an embodiment, rendering 1200 is updated, in FIG. 16, to include coded representations of paths; a key table 1602 is visually displayed near the map and comprises a key column 1604 of matching key values corresponding to paths, a territory column 1605 identifying path names or numbers, and a decile column 1606 specifying corresponding sums of units on each path. Key column 1604 will be seen to define three different paths according to different colors or other coding. As previously described, ease of access within and between the subsections of each territory is the primary consideration. In the example of FIG. 16, one territory associated with downtown San Francisco is more compact than the others, likely due to the population density being higher there in comparison to the other Zip codes. In some embodiments, processes may be programmed to cause each territory to reflect an equitable travel load, with some large sections and some small sections and relatively similar maximum travel demands. Equity can be achieved through various other means and may not be necessary or effective for different organizations.

Figure 17:
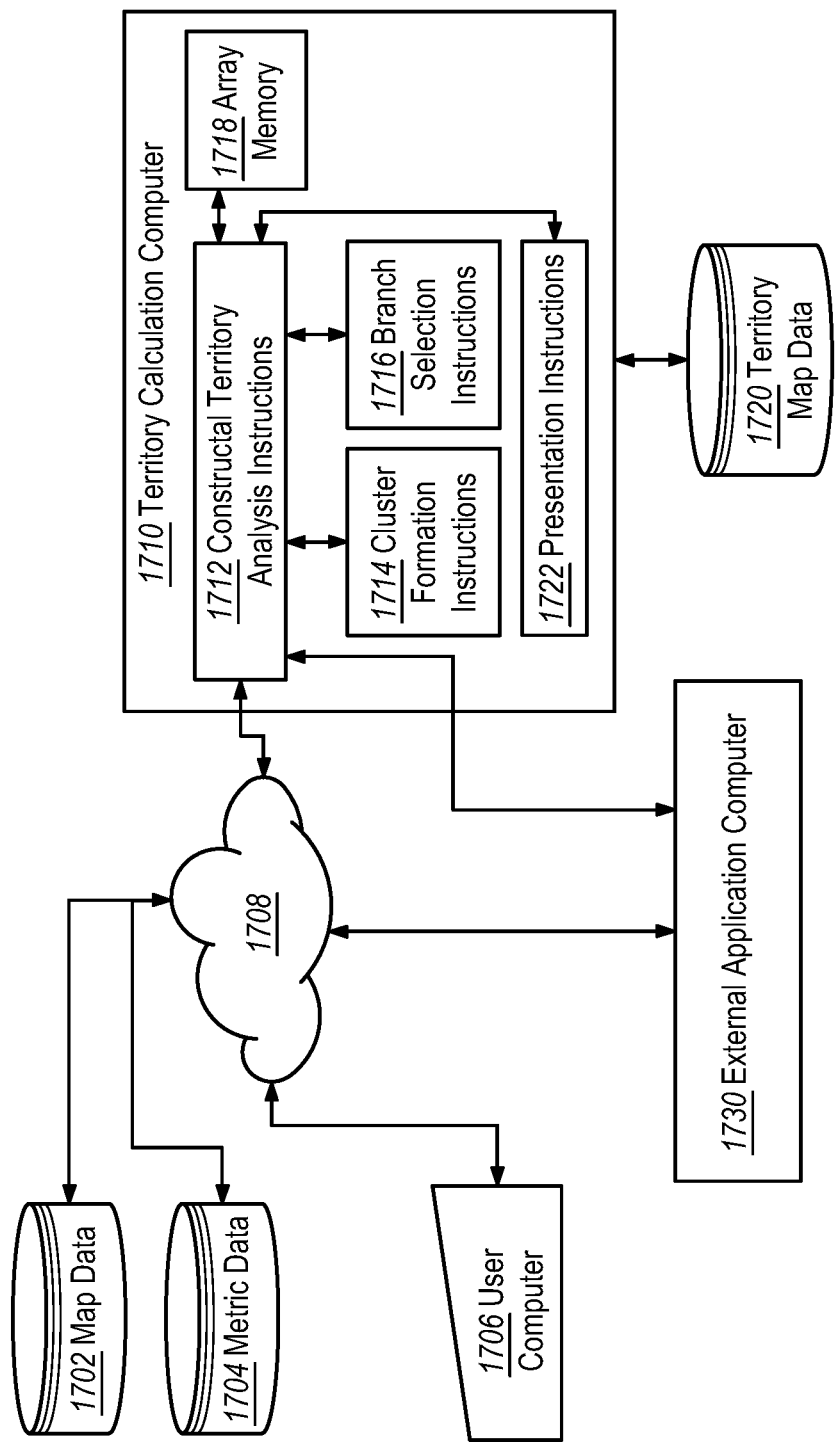
FIG. 17 illustrates an example distributed computer system with which an embodiment may be implemented.

3. Structural and Functional Overview—Computer System Implementation Example FIG. 17 illustrates an example distributed computer system with which an embodiment may be implemented. In an embodiment, a computer system 1700 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 17 illustrates only one of many possible arrangements of components configured to execute the programming described herein. Other arrangements may include fewer or different components, and the division of work between the components may vary depending on the arrangement.

FIG. 17, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, in a distributed computer system as shown in FIG. 17, digitally stored map data 1702 and digitally stored metric data 1704 are communicatively coupled directly or indirectly via one or more networks 1708 to a territory calculation computer 1710. Map data 1702 and metric data 1704 may be stored in one or more relational databases, flat file systems, object databases, or other data repositories, using the same storage system or different storage systems. Map data 1702 comprises a plurality of digitally stored data values that are formatted or coded to define a digital map capable of visual rendering on a computer display to represent a geographically accurate representation of a physical territory or location. Metric data 1704 comprises data values corresponding to units in the map data and typically express a level of work, number of customers, or other relative magnitude that may affect the calculation and assignment or balanced geographical territories within a region represented in the map data 1702.

Network 1708 of FIG. 17 broadly represents one or more digital data communication networks and may comprise any combination of local area networks, wide area networks, campus networks, or internetworks using any of wired or wireless, terrestrial or satellite data communication links.

Territory calculation computer 1710 comprises a server computer, workstation, desktop computer, laptop computer, or virtual machine instance having one or more processors, cores, or clusters. Territory calculation computer 1710 is specially programmed with Constructal territory analysis instructions 1712, cluster formation instructions 1714, branch selection instructions 1716 and, optionally, presentation instructions 1722. Each of the Constructal territory analysis instructions 1712, cluster formation instructions 1714, branch selection instructions 1716 and presentation instructions 1722 comprises one or more sequences of executable program instructions that are arranged and programmed to cause one or more processors of the territory calculation computer 1710 to execute the functions that are further described herein with reference to FIG. 18A, FIG. 18B, FIG. 18C, FIG. 19. In an embodiment, execution of the functions results in generating and digitally writing territory map data 1720 in a digital data storage system, which may be the same system as for map data 1702, metric data 1704, or a different system. In an embodiment, the foregoing elements are programmed to solve the technical problem of how to dynamically calculate and update balanced territories consisting of one or more units of a digital map in response to changes in metric values associated with the units.

Territory calculation computer 1710 further comprises a set of digitally stored configuration parameters, which may be statically defined as constants in a program, stored in a configuration file or other flat file, or retrieved on demand from a data repository. In an embodiment, configuration parameters specify variable values that govern how territories are calculated, aligned, defined, and output as territory map data 1720. Thus, map data 1702 and metric data 1704 form basic sources of input data to the Constructal territory analysis instructions 1712, and configuration parameters impose constraints or controls on the internal calculations embodied in the Constructal territory analysis instructions.

Figure 18A:
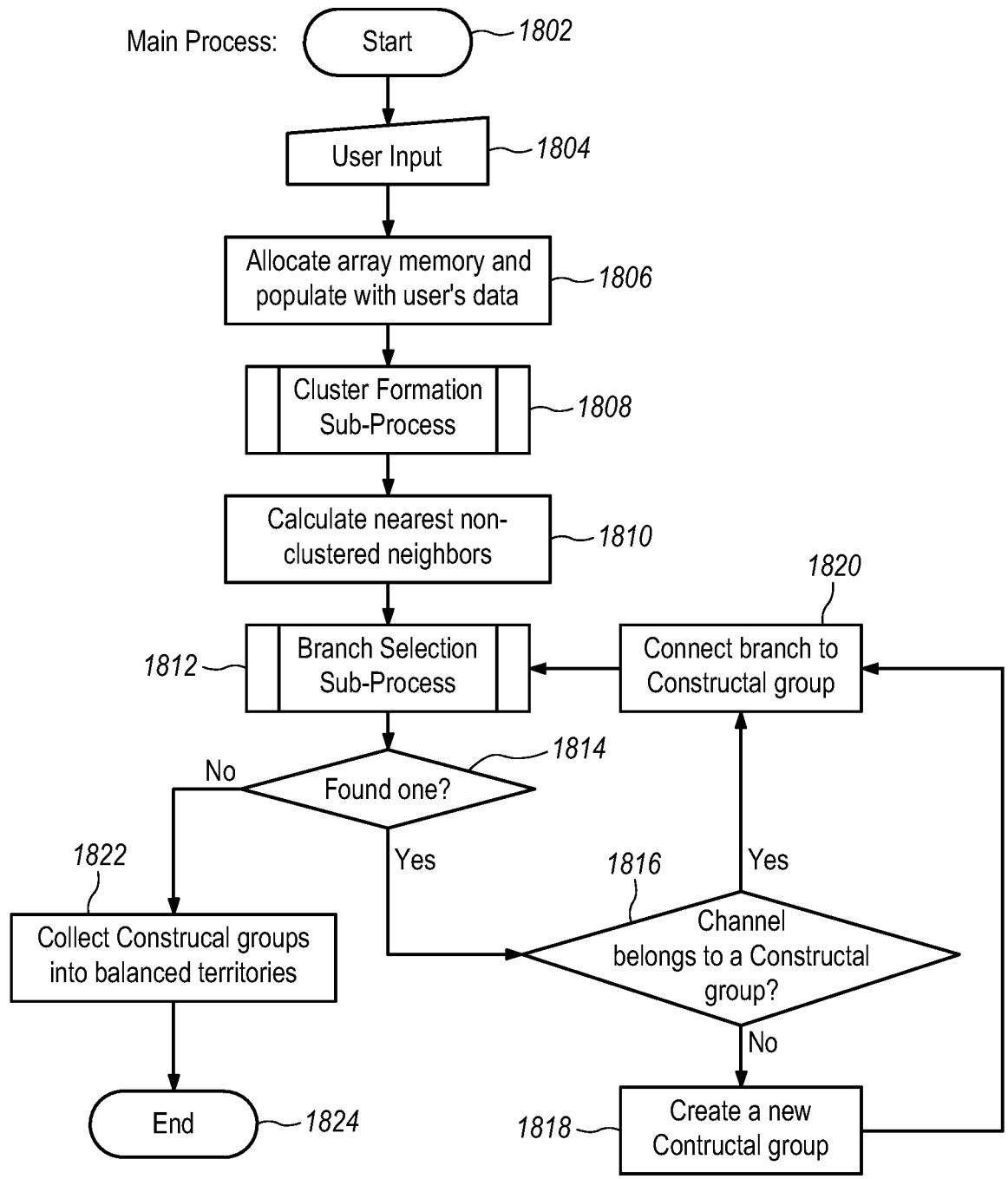
FIG. 18A illustrates a programmable process of generating territory alignments for digital maps.
Figure 18B:
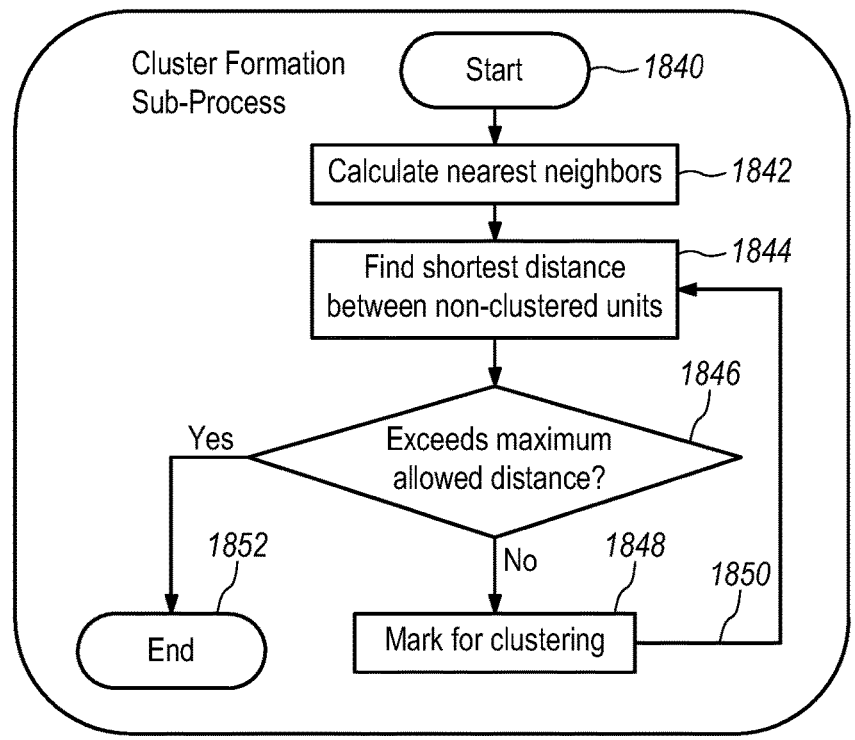
FIG. 18B illustrates a cluster formation sub-process that may be programmed as part of FIG. 18A.
Figure 18C:
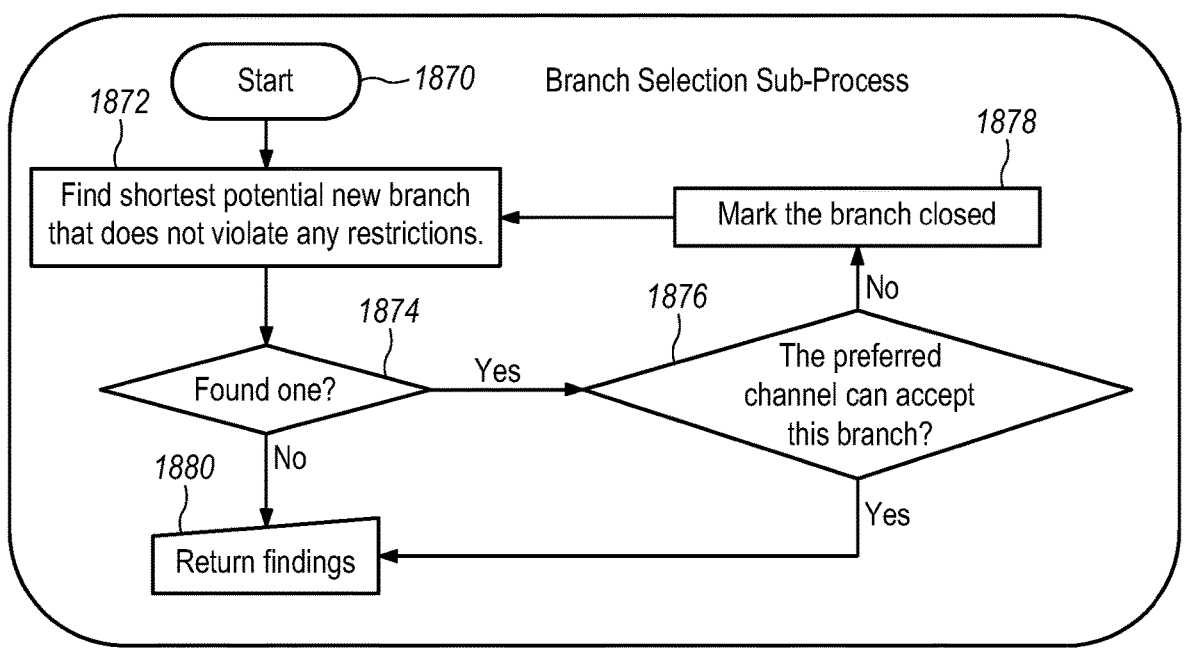
FIG. 18C illustrates a branch selection sub-process that may be programmed as part of FIG. 18A.

Territory calculation computer 1710 further comprises array memory 1718 coupled to Constructal territory analysis instructions 1712, and capable of allocation, writing and reading as described for FIG. 18A, FIG. 18B, FIG. 18C to store elements of map data 1702 and metric data 1704, intermediate results of units, neighbors, clusters, branches, and groups, as further described in other sections herein.

Presentation instructions 1722, when used, are programmed to digitally render visual representations of the map data 1702, with or without metric data 1704, and/or territory map data, for visual presentation on a computer display device. In one embodiment, a user computer 1706 is communicatively coupled to network 1708 and functions as an input-output device to interface with territory calculation computer 1710. In such an embodiment, user computer 1706 may be operated to identify, select, and/or input the map data 1702, metric data 1704, and configuration parameters to territory calculation computer 1710 and/or to receive presentation of territory map data 1720 from presentation instructions 1722. In one embodiment, user computer 1706 comprises a browser program that is compatible with dynamically generated markup language instructions that the presentation instructions 1722 generate in response to calls, commands, or requests from Constructal territory analysis instructions 1712. For example, the Constructal territory analysis instructions 1712 and presentation instructions 1722 may be programmed to interoperate to generate a graphical user interface for display at user computer 1706 to facilitate human-computer interaction to provide the map data 1702, metric data 1704 and/or configuration parameters, view the territory map data 1720, and change one or more of the foregoing in a continuous, interactive manner to yield new output in the form of updated territory map data. In an embodiment, the foregoing elements may implement a browser-based, software-as-a-service (SaaS) system in which the browser forms the principal human-computer interaction tool by which a human user may interact with territory calculation computer 1710 to select and direct input data, adjust configuration parameters, and view rendered output data.

Optionally, an external application computer 1730 may be communicatively coupled to network 1708 and may communicate programmatically with Constructal territory analysis instructions 1712. "External," in this context, merely means logically separate from the territory calculation computer 1710, for example, separately addressable using network messages with different destination addresses. In other embodiments, external application computer 1730 and territory calculation computer 1710 may be hosted using the same virtual machine instances or as peer instances in the same cloud computing center or other data center.

The territory map data 1720 that territory calculation computer 1710 creates and stores, as further described in other sections, may form useful input for other computer systems. For example, external application computer 1730 may be programmed to implement a multi-tenant, SaaS-based incentive calculation server application to calculate, in part, incentive compensation sales compensation values based on complex graphs or hierarchies of incentive compensation sales plans. In this context, access to accurate, dynamically updated, balanced geographic territories, based on relevant metric values of units in the territories, may substantially increase the accuracy and flexibility of the SaaS application. Therefore, in some embodiments, Constructal territory analysis instructions 1712 may be programmed to implement an application programming interface or other programmatic communications mechanism that external application computer 1730 can call or use to obtain territory map data 1720 for use in the external application computer or its separately programmed applications. In this manner, the solutions of this disclosure provide practical technical solutions that may affect a computer system other than the territory calculation computer 1710 and solve useful computational problems in domains other than digital mapping.

FIG. 18A illustrates a programmable process of generating territory alignments for digital maps. FIG. 18B illustrates a cluster formation sub-process that may be programmed as part of FIG. 18A. FIG. 18C illustrates a branch selection sub-process that may be programmed as part of FIG. 18A. FIG. 18A, FIG. 18B, FIG. 18C and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In an embodiment, start operation 1802 specifies an initial point of execution of the processes of FIG. 18A, FIG. 18B, FIG. 18C. In an embodiment, the following conditions and resources are assumed to exist at the start of execution. First, FIG. 18A assumes that an end user has prepared and provided access to a data source containing one or more geographic summary values and/or individual account locations and values for relevant metrics. Each data point may comprise information by which it can be geographically located on a map and related in physical space to neighboring data points. For example, a data source may comprise an association of {Zip code, Population, Volume}. Another example could be {Latitude, Longitude, Account ID, Account Name, Historic Sales Volume}.

TABLE 1 and TABLE 2 present two examples.

TABLE 1

EXAMPLE DATA TABLE

|    | A        | B          | C      |
|----|----------|------------|--------|
| 1  | Zip Code | Population | Volume |
| 2  | 43001    | 7947       | 50644  |
| 3  | 43003    | 1310       | 58242  |
| 4  | 43011    | 4130       | 56169  |
| 5  | 43015    | 49418      | 283669 |
| 6  | 43023    | 11420      | 130629 |
| 7  | 43027    | 910        | 23053  |
| 8  | 43040    | 23721      | 237720 |
| 9  | 43044    | 4534       | 48883  |
| 10 | 43050    | 43670      | 400143 |

TABLE 2

EXAMPLE DATA TABLE

|    | A          | B                              | C              |
|----|------------|--------------------------------|----------------|
| 1  | Account ID | Account Name                   | Total Students |
| 2  | A00001     | ELI TERRY SCHOOL               | 448            |
| 3  | A00002     | HOMEBOUND                      | 0              |
| 4  | A00003     | STAFFORD DAY TREATMENT PROGRAM | 0              |
| 5  | A00004     | ROCKVILLE HIGH SCHOOL          | 1211           |
| 6  | A00005     | NORTHEAST SCHOOL               | 327            |
| 7  | A00006     | HOMEBOUND                      | 0              |
| 8  | A00007     | MAPLE STREET SCHOOL            | 404            |
| 9  | A00008     | ELLINGTON MIDDLE SCHOOL        | 366            |
| 10 | A00009     | EARL M. WITT INTERMEDIATE      | 291            |

Furthermore, FIG. 18A presumes that the computer system 1700 has access to a searchable, pre-compiled data table comprising a complete roster of relevant geographic entities, with distance and travel speed or travel time calculations for each entity to each adjacent or bordering entity. For example, the data table could comprise a column storing a first Zip code, a second Zip code, a distance between centroid points of the two Zip codes, and an estimated travel time for travel between the centroids, with rows of the foregoing form for every pair of Zip codes that represents a unique adjacency.

FIG. 18A further presumes the execution of a step to allocate working memory or RAM in computer system 1700 to maintain an array of Constructal relationship information. In an embodiment, the indexed length of the array is equal to the number of units to be represented in the problem. In an embodiment, each element of the array stores, for a given unit: a data metric value of the unit; a sub-array of indices for units branching from the unit; a channel value comprising the index of the parent unit from which the unit branches; a cluster queen value comprising the index of the unit at the head of a cluster grouping that includes the unit; a Constructal group assignment value or index; a branching level value; a cluster queen flag value, which may be a Boolean value.

At operation 1804 of FIG. 18A, the process is programmed to receive input of a plurality of parameter values to govern calculation of clusters and alignment of territories. The input may be received as user input in an interactive system, or by loading or reading a configuration file, database table, object store, other data repository, or by receiving a call, method invocation, or other programmatic signal. Or, parameter values may be programmed using constant values as defaults that can be overridden or updated using any of the techniques of this paragraph.

In one embodiment, operation 1804 comprises displaying a graphical user interface window. FIG. 19 illustrates an example graphical user interface that may be used in one embodiment. In the example of FIG. 19, a window 1902 comprises a widget 1904 that is programmed to receive numeric input specifying a maximum clustering distance; a widget 1906 that is programmed to receive numeric input specifying a maximum branches per node; a widget 1908 that is programmed to receive numeric input specifying maximum levels of reach; a widget 1910 that is programmed to receive numeric input specifying neighbor search depth; a widget 1912 that is programmed to receive a selection of a particular data source from among a plurality of available data sources; a widget 1914 that is programmed to receive numeric input specifying a maximum group data mil rate; and Cancel and OK buttons that are programmed, respectively, to exit the window or submit the data values entered in the other windows to the server computer.

In an embodiment, one step in the process of FIG. 18A, as discussed in other sections herein, is to cluster units that are close to one another. In subsequent steps, units clustered together are treated as a single entity. The maximum clustering distance associated with widget 1904 controls the maximum separation distance that the programmed process uses when clustering units.

In an embodiment, the process is programmed to group units based on child-parent relationships of units. A child unit is a branch of a parent unit or channel unit. In an embodiment, the numeric input specifying a maximum branches per node that is received via widget 1906 specifies the maximum number of branches or child units that may be instantiated and associated for any particular channel unit.

In an embodiment, the center or starting unit for a Constructal group is considered to be at level zero for the group. Each unit that branches directly from a center unit is considered to be at level one. Units that branch from a level one unit are level two, and so on. The numeric input specifying maximum levels of reach, received via widget 1908, specifies the maximum number of levels that any Constructal group may allow.

In an embodiment, when inspecting a new branch relationship for a given channel, the process is programmed to choose the best candidate from among the N nearest neighbor units nearest to a particular channel unit. The numeric input specifying neighbor search depth, received via widget 1910, may specify the maximum number of N nearest neighbors that are evaluated.

In an embodiment, a selection of a particular data source from among a plurality of available data sources, via widget 1912, enables user specification of which data field from a user-provided data source is to be considered when limiting the accumulation within each Constructal grouping and ultimately when creating balanced territories.

In an embodiment, a maximum amount of accumulated data that any Constructal grouping may contain is specified via the numeric input specifying a maximum group data mil rate at widget 1914. A specific value may be provided, or a fraction of the total data for the problem may be provided. For example, mil rate refers to thousandths of the total.

Referring again to FIG. 18A, in an embodiment, at step 1806, the process is programmed to allocate array memory and populate the memory with user data. In an embodiment, step 1806 comprises populating a data metric value for each unit, from the user-provided data source, and calculating the data total for all units in the problem.

At step 1808, a cluster formation sub process is executed. FIG. 18B illustrates a cluster formation sub-process that may be programmed as part of FIG. 18A. In an embodiment, the process of FIG. 18B initiates execution at step 1840 and proceeds to calculate nearest neighbors at step 1842. In some embodiments, step 1842 includes sub steps to: allocate an array to maintain the unit index of nearest neighbor; allocate an array to maintain the distance between the units; calculate distances and populate the arrays for up to the maximum allowed neighbors.

At step 1844, the process of FIG. 18B enters a clustering loop. Step 1844 is programmed to find the shortest distance between nearest neighbors which have not yet been clustered. In this context, "shortest distance" refers to a distance that is no greater than the maximum allowed clustering distance, as tested at step 1846. If the maximum allowed clustering distance limitation is satisfied, then at step 1848, the process is programmed to mark for clustering. Step 1848 may comprise updating the clustering values for the units. In an embodiment, the updating comprises setting the cluster queen index for subject units and flagging the cluster queen unit. As indicated by path 1850 joining step 1848 to step 1844, the process is programmed to repeat until no more cluster candidates are found, which occurs when the test of step 1846 is positive or TRUE. At end step 1852, the process of FIG. 18B may be programmed to release memory that had been allocated as workspace for the process.

Referring again to FIG. 18A, at step 1810, the process is programmed to re-calculate the nearest non-clustered neighbor units. The term "re-calculate" is used to disambiguate from the first step of FIG. 18B. In an embodiment, the same execution of FIG. 18B, step 1842, is used, while skipping units that have an assigned cluster queen value.

At step 1812, the process is programmed to execute a branch selection sub process. FIG. 18C illustrates a branch selection sub-process that may be programmed as part of FIG. 18A.

In an embodiment, the process starts at step 1870. At step 1872, the process is programmed to find the potential branch unit whose distance to its preferred potential channel unit is shortest and does not violate a programmed set of constraints or restrictions. In an embodiment, the constraints are programmed as: Do not consider, as a potential branch, any unit that already has an assigned channel unit; Consider all nearest neighbors, up the maximum allowed, as potential channel unit candidates; Ignore units with an assigned cluster queen value, both for potential branches and channels; Disqualify any potential branch-channel connection that would result in a unit level value that exceeds the maximum allowed, but any zero-level unit may be considered as a potential branch for a neighboring channel, including the center or base unit for another Constructal group; Disqualify any potential channel that has already filled its maximum allowed number of branches; Disqualify any potential channel that is part of the branching from the potential branch unit (creating a circular channel scenario); Disqualify any branch-channel connection that would result in a group data total that exceeds the maximum allowed.

Step 1874 is programmed to test whether a potential branch unit has been found. If so, then control transfers to step 1876, which is programmed to test whether the preferred channel can accept the selected branch. If not, then step 1878 is programmed to mark the branch closed, and control transfers to step 1872 to initiate another search. Or, if the preferred channel can accept the selected branch, then control transfers to step 1880, which is programmed to return to the process of FIG. 18A to provide result data. Further, if the test of step 1874 is No or FALSE, then control also transfers to step 1880 with similar effect.

Referring again to FIG. 18A, step 1814 tests the returned results of the branch selection sub process to determine whether a branch was identified. If step 1814 is positive or TRUE, then control transfers to step 1816 to test whether the specified channel belongs to a Constructal group; step 1816 can involve scanning or testing all existing groups in memory. If the test of step 1816 is positive or TRUE, then control transfers to step 1820 at which the branch identified by the branch selection sub process is connected to the Constructal group that was identified at step 1816. However, if the test of step 1816 is negative or FALSE, then control transfers to step 1818 at which a new Constructal group is created; control then transfers to step 1820 at which the branch identified by the branch selection sub process is connected to the Constructal group that was just created at step 1818.

If step 1814 is negative or FALSE, then control transfers to step 1822, at which the process is programmed to collect the Constructal groups into balanced territories using a territory creation method. An example territory creation method is XACTLY ALIGNSTAR OPTIMIZER from Xactly Corporation, San Jose, California. The process then ends, or returns control to another process, at step 1824.

Thus, if execution of FIG. 18C returns useful data, then the process of FIG. 18A is programmed to implement the chosen branch-channel grouping. Step 1814 is programmed to test whether valid return data was received from FIG. 18C. If so, and the chosen channel does not belong to an existing group, as tested at step 1816, the process is programmed at step 1818 to create a new group with the channel unit as its center. In an embodiment, branch connection at step 1820 may comprise: Add the branch unit to the channel unit's group; Evaluate the group for balanced branching and assign a better center for the group, if one can be found; Update all unit and group values, as needed. The foregoing process is executed iteratively until no more grouping changes can be implemented.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 20:
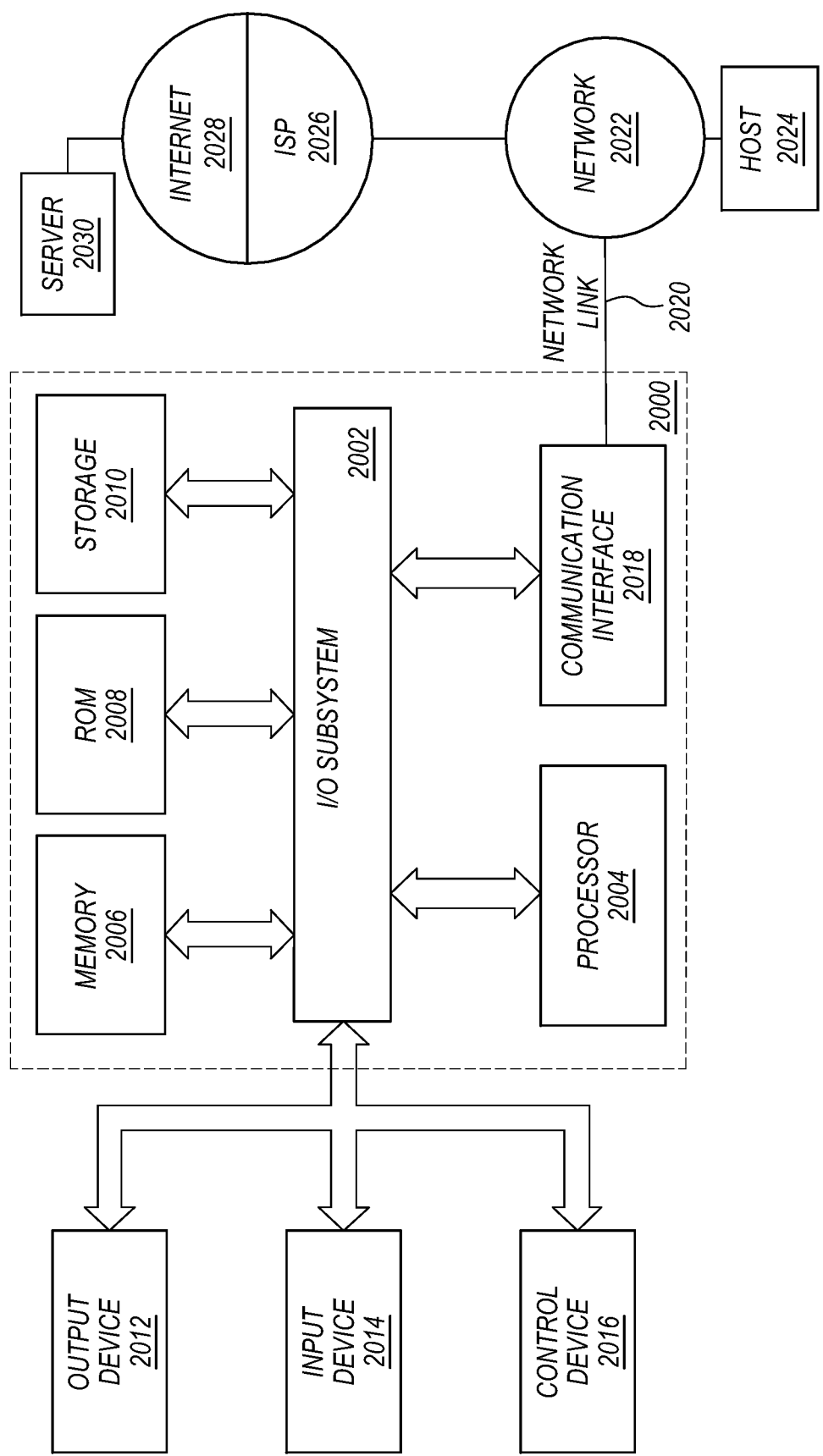
FIG. 20 illustrates a computer system with which one embodiment could be implemented.

FIG. 20 is a block diagram that illustrates an example computer system with which an embodiment may be implemented. In the example of FIG. 20, a computer system 2000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 2000 includes an input/output (I/O) subsystem 2002 which may include a bus and/or other communication mechanism(s) for communicating information and/or instructions between the components of the computer system 2000 over electronic signal paths. The I/O subsystem 2002 may include an I/O controller, a memory controller and at least one I/O port. The electronic signal paths are represented schematically in the drawings, for example as lines, unidirectional arrows, or bidirectional arrows.

At least one hardware processor 2004 is coupled to I/O subsystem 2002 for processing information and instructions. Hardware processor 2004 may include, for example, a general-purpose microprocessor or microcontroller and/or a special-purpose microprocessor such as an embedded system or a graphics processing unit (GPU) or a digital signal processor or ARM processor. Processor 2004 may comprise an integrated arithmetic logic unit (ALU) or may be coupled to a separate ALU.

Computer system 2000 includes one or more units of memory 2006, such as a main memory, which is coupled to I/O subsystem 2002 for electronically digitally storing data and instructions to be executed by processor 2004. Memory 2006 may include volatile memory such as various forms of random-access memory (RAM) or other dynamic storage device. Memory 2006 also may be used for storing temporary variables or other intermediate information during execution of instructions to be executed by processor 2004. Such instructions, when stored in non-transitory computer-readable storage media accessible to processor 2004, can render computer system 2000 into a special-purpose machine that is customized to perform the operations specified in the instructions.

Computer system 2000 further includes non-volatile memory such as read only memory (ROM) 2008 or other static storage device coupled to I/O subsystem 2002 for storing information and instructions for processor 2004. The ROM 2008 may include various forms of programmable ROM (PROM) such as erasable PROM (EPROM) or electrically erasable PROM (EEPROM). A unit of persistent storage 2010 may include various forms of non-volatile RAM (NVRAM), such as FLASH memory, or solid-state storage, magnetic disk or optical disk such as CD-ROM or DVD-ROM and may be coupled to I/O subsystem 2002 for storing information and instructions. Storage 2010 is an example of a non-transitory computer-readable medium that may be used to store instructions and data which when executed by the processor 2004 cause performing computer-implemented methods to execute the techniques herein.

The instructions in memory 2006, ROM 2008 or storage 2010 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 2000 may be coupled via I/O subsystem 2002 to at least one output device 2012. In one embodiment, output device 2012 is a digital computer display. Examples of a display that may be used in various embodiments include a touch screen display or a light-emitting diode (LED) display or a liquid crystal display (LCD) or an e-paper display. Computer system 2000 may include other type(s) of output devices 2012, alternatively or in addition to a display device. Examples of other output devices 2012 include printers, ticket printers, plotters, projectors, sound cards or video cards, speakers, buzzers or piezoelectric devices or other audible devices, lamps or LED or LCD indicators, haptic devices, actuators or servos.

At least one input device 2014 is coupled to I/O subsystem 2002 for communicating signals, data, command selections or gestures to processor 2004. Examples of input devices 2014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 2016, which may perform cursor control or other automated control functions such as navigation in a graphical interface on a display screen, alternatively or in addition to input functions. Control device 2016 may be a touchpad, a mouse, a trackball, or cursor direction keys for communicating direction information and command selections to processor 2004 and for controlling cursor movement on display 2012. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 2014 may include a combination of multiple different input devices, such as a video camera and a depth sensor.

In another embodiment, computer system 2000 may comprise an internet of things (IoT) device in which one or more of the output device 2012, input device 2014, and control device 2016 are omitted. Or, in such an embodiment, the input device 2014 may comprise one or more cameras, motion detectors, thermometers, microphones, seismic detectors, other sensors or detectors, measurement devices or encoders and the output device 2012 may comprise a special-purpose display such as a single-line LED or LCD display, one or more indicators, a display panel, a meter, a valve, a solenoid, an actuator or a servo.

When computer system 2000 is a mobile computing device, input device 2014 may comprise a global positioning system (GPS) receiver coupled to a GPS module that is capable of triangulating to a plurality of GPS satellites, determining and generating geo-location or position data such as latitude-longitude values for a geophysical location of the computer system 2000. Output device 2012 may include hardware, software, firmware and interfaces for generating position reporting packets, notifications, pulse or heartbeat signals, or other recurring data transmissions that specify a position of the computer system 2000, alone or in combination with other application-specific data, directed toward host 2024 or server 2030.

Computer system 2000 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 2000 in response to processor 2004 executing at least one sequence of at least one instruction contained in main memory 2006. Such instructions may be read into main memory 2006 from another storage medium, such as storage 2010. Execution of the sequences of instructions contained in main memory 2006 causes processor 2004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 2010. Volatile media includes dynamic memory, such as memory 2006. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 2002. Transmission media can also take the form of acoustic or light waves, such as those generated during radio-wave and infra-red data communications.

Various forms of media may be involved in carrying at least one sequence of at least one instruction to processor 2004 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 2000 can receive the data on the communication link and convert the data to a format that can be read by computer system 2000. For instance, a receiver such as a radio frequency antenna or an infrared detector can receive the data carried in a wireless or optical signal and appropriate circuitry can provide the data to I/O subsystem 2002 such as place the data on a bus. I/O subsystem 2002 carries the data to memory 2006, from which processor 2004 retrieves and executes the instructions. The instructions received by memory 2006 may optionally be stored on storage 2010 either before or after execution by processor 2004.

Computer system 2000 also includes a communication interface 2018 coupled to bus 2002. Communication interface 2018 provides a two-way data communication coupling to network link(s) 2020 that are directly or indirectly connected to at least one communication networks, such as a network 2022 or a public or private cloud on the Internet. For example, communication interface 2018 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 2022 broadly represents a local area network (LAN), wide-area network (WAN), campus network, internetwork or any combination thereof. Communication interface 2018 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 2018 sends and receives electrical, electromagnetic or optical signals over signal paths that carry digital data streams representing various types of information.

Network link 2020 typically provides electrical, electromagnetic, or optical data communication directly or through at least one network to other data devices, using, for example, satellite, cellular, Wi-Fi, or BLUETOOTH technology. For example, network link 2020 may provide a connection through a network 2022 to a host computer 2024.

Furthermore, network link 2020 may provide a connection through network 2022 or to other computing devices via internetworking devices and/or computers that are operated by an Internet Service Provider (ISP) 2026. ISP 2026 provides data communication services through a world-wide packet data communication network represented as internet 2028. A server computer 2030 may be coupled to internet 2028. Server 2030 broadly represents any computer, data center, virtual machine or virtual computing instance with or without a hypervisor, or computer executing a containerized program system such as DOCKER or KUBERNETES. Server 2030 may represent an electronic digital service that is implemented using more than one computer or instance and that is accessed and used by transmitting web services requests, uniform resource locator (URL) strings with parameters in HTTP payloads, API calls, app services calls, or other service calls. Computer system 2000 and server 2030 may form elements of a distributed computing system that includes other computers, a processing cluster, server farm or other organization of computers that cooperate to perform tasks or execute applications or services. Server 2030 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 2030 may comprise a web application server that hosts a presentation layer, application layer and data storage layer such as a relational database system using structured query language (SQL) or no SQL, an object store, a graph database, a flat file system or other data storage.

Computer system 2000 can send messages and receive data and instructions, including program code, through the network(s), network link 2020 and communication interface 2018. In the Internet example, a server 2030 might transmit a requested code for an application program through Internet 2028, ISP 2026, local network 2022 and communication interface 2018. The received code may be executed by processor 2004 as it is received, and/or stored in storage 2010, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 2004. While each processor 2004 or core of the processor executes a single task at a time, computer system 2000 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method executed by a computer, the computer-implemented method comprising:
    obtaining digitally stored map data that defines a plurality of geographic units, and obtaining digitally stored metric data that defines a magnitude value for each of the plurality of geographic units;
    allocating array memory of the computer and digitally storing the digitally stored map data in the array memory in association with the digitally stored metric data;
    selecting, from the digitally stored map data in the array memory, a plurality of different geographic units;
    for each unit among the plurality of different geographic units that have been selected, calculating one or more nearest neighbor units, determining a shortest physical distance between non-clustered units among the one or more nearest neighbor units that is less than or equal to a maximum allowed distance value, marking said non-clustered units having the shortest physical distance for clustering, and repeating the calculating, determining, and marking until no more units can be clustered;
    treating units clustered together as a single entity, finding one or more shortest potential new branches that conform to a plurality of programmed constraints;
    defining, in the array memory, at least one channel;
    determining whether a particular channel can accept the one or more shortest potential new branches, and in response thereto, determining whether the particular channel belongs to an existing Constructal group, and in response thereto, connecting the one or more shortest potential new branches to the existing Constructal group, or if not, creating a new Constructal group and connecting the one or more shortest potential new branches to the new Constructal group; and repeating the finding, determining, and connecting until no channel can accept any branch;
    creating and storing, in digital data storage, territory data comprising two or more territory definitions and associating all existing Constructal groups with the two or more territory definitions, the two or more territory definitions defining balanced geographic territories in a geographical map;
    for one or more units among the plurality of different geographic units that have been selected, identifying a center unit, wherein the center unit serves as a temporary base of operations within the units clustered together, wherein the temporary base of operations is associated with a physical location;
    each of the one or more nearest neighbor units, non-clustered units, branches, channels, and groups being stored in the array memory;
    programmatically transmitting the territory data to one or more of a set of presentation instructions and an external application computer;
    detecting changes in metric data associated with one or more existing geographic units located within one or more of the existing Constructal groups, each Constructal group representing a territory and comprising one or more subsections, wherein detected changes in the metric data result in values associated with the one or more subsections within one or more of the existing Constructal groups exceeding a threshold value; and
    responsive to the values associated with the one or more subsections within the one or more of the existing Constructal groups exceeding the threshold value, automatically rebalancing two or more existing Constructal groups to change the values associated with the one or more subsections within each Constructal group to be at or under the threshold value and to change a group total value corresponding to a number of geographic units associated with each Constructal group to be equally balanced between the two or more existing Constructal groups.

2. The computer-implemented method of claim 1, each element of the array memory storing, for a given unit: a data metric value of the given unit; a sub-array of indices for units branching from the given unit; a channel value comprising an index of a parent unit from which the given unit branches; a cluster queen value comprising an index of the given unit at a head of a cluster grouping that includes the given unit; a Constructal group assignment value; a branching level value; and a cluster queen flag value.

3. The computer-implemented method of claim 2, the plurality of programmed constraints comprising: Do not consider, as a potential branch, any unit that already has an assigned channel unit; Consider all nearest neighbors, up to the maximum allowed distance value, as potential channel unit candidates; Ignore units with an assigned cluster queen value, for potential branches and channels; Disqualify any potential connection of a branch and channel that would result in a unit level value that exceeds a maximum allowed unit level value, but any zero-level unit may be considered as a potential branch for a neighboring channel, including a base unit for another Constructal group; Disqualify any potential channel having a specified maximum allowed number of branches; Disqualify any potential channel that branches from the potential branch; and Disqualify any connection of a branch and channel that would result in a group data total that exceeds a specified maximum allowed group data total.

4. The computer-implemented method of claim 2, further comprising:
    obtaining, via an input using a widget of a graphical user interface, all of the maximum allowed distance value; a maximum allowed unit level value; a maximum allowed number of branches; and a maximum allowed group data total; and
    using the maximum allowed distance value in a step of determining the shortest physical distance, using the maximum allowed unit level value in a step of determining whether the particular channel can accept the one or more shortest potential new branches, using the maximum allowed number of branches in a step of finding the one or more shortest potential new branches, and using the maximum allowed group data total that was obtained via the input using a widget of the graphical user interface in a step of creating the new Constructal group.

5. The computer-implemented method of claim 2, the digitally stored map data representing a plurality of different Zip code values corresponding to a plurality of United States Zip codes; and the digitally stored metric data specifying a plurality of integer data values, each of the plurality of integer data values corresponding to one of the plurality of different Zip code values, and each of the plurality of integer data values specifying a number of business entities of a specified type that are within corresponding Zip code values.

6. The computer-implemented method of claim 2, further comprising causing generating a digital graphical visual display of the territory data on a display device of a user computer that is communicatively coupled via a network.

7. The computer-implemented method of claim 2, the two or more territory definitions of the territory data each being associated with a different set of one or more identifiers of incentive compensated sales representatives, the computer-implemented method further comprising transmitting the territory data to an incentive sales calculation application.

8. The computer-implemented method of claim 2, the digitally stored map data defining a geographic map of a physical region of Earth and comprising the plurality of geographic units.

9. One or more non-transitory computer-readable storage media storing one or more sequences of instructions which, when executed using one or more processors of a computer, cause the one or more processors to execute operations of:
  obtaining digitally stored map data that defines a plurality of geographic units, and obtaining digitally stored metric data that defines a magnitude value for each of the plurality of geographic units;
  allocating array memory of the computer and digitally storing the digitally stored map data in the array memory in association with the digitally stored metric data;
  selecting, from the digitally stored map data in the array memory, a plurality of different geographic units;
  for each unit among the plurality of different geographic units that have been selected, calculating one or more nearest neighbor units, determining a shortest physical distance between non-clustered units among the one or more nearest neighbor units that is less than or equal to a maximum allowed distance value, marking said non-clustered units having the shortest physical distance for clustering, and repeating the calculating, determining, and marking until no more units can be clustered;
  treating units clustered together as a single entity, finding one or more shortest potential new branches that conform to a plurality of programmed constraints;
  defining, in the array memory, at least one channel;
  determining whether a particular channel can accept the one or more shortest potential new branches, and in response thereto, determining whether the particular channel belongs to an existing Constructal group, and in response thereto, connecting the one or more shortest potential new branches to the existing Constructal group, or if not, creating a new Constructal group and connecting the one or more shortest potential new branches to the new Constructal group; and repeating the finding, determining, and connecting until no channel can accept any branch;
  creating and storing, in digital data storage, territory data comprising two or more territory definitions and associating all existing Constructal groups with the two or more territory definitions, the two or more territory definitions defining balanced geographic territories in a geographical map;
  for one or more units among the plurality of different geographic units that have been selected, identifying a center unit, wherein the center unit serves as a temporary base of operations within the units clustered together, wherein the temporary base of operations is associated with a physical location;
  each of the one or more nearest neighbor units, non-clustered units, branches, channels, and groups being stored in the array memory;
  programmatically transmitting the territory data to one or more of a set of presentation instructions and an external application computer;
  detecting changes in metric data associated with one or more existing geographic units located within one or more of the existing Constructal groups, each Constructal group representing a territory and comprising one or more subsections, wherein detected changes in the metric data results in values associated with the one or more subsections within one or more of the existing Constructal groups exceeding a threshold value; and
  responsive to the values associated with the one or more subsections within the one or more of the existing Constructal groups exceeding the threshold value, automatically rebalancing two or more existing Constructal groups to change the values associated with the one or more subsections within each Constructal group to be at or under the threshold value and to change a group total value corresponding to a number of geographic units associated with each Constructal group to be equally balanced between the two or more existing Constructal groups.

10. The one or more non-transitory computer-readable storage media of claim 9, each element of the array memory storing, for a given unit: a data metric value of the given unit; a sub-array of indices for units branching from the given unit; a channel value comprising an index of a parent unit from which the given unit branches; a cluster queen value comprising an index of the given unit at a head of a cluster grouping that includes the given unit; a Constructal group assignment value; a branching level value; and a cluster queen flag value.

11. The one or more non-transitory computer-readable storage media of claim 10, the plurality of programmed constraints comprising: Do not consider, as a potential branch, any unit that already has an assigned channel unit; Consider all nearest neighbors, up to the maximum allowed distance value, as potential channel unit candidates; Ignore units with an assigned cluster queen value, for potential branches and channels; Disqualify any potential connection of a branch and channel that would result in a unit level value that exceeds a maximum allowed unit level value, but any zero-level unit may be considered as a potential branch for a neighboring channel, including a base unit for another Constructal group; Disqualify any potential channel having a specified maximum allowed number of branches; Disqualify any potential channel that branches from the potential branch; and Disqualify any connection of a branch and channel that would result in a group data total that exceeds a specified maximum allowed group data total.

12. The one or more non-transitory computer-readable storage media of claim 10, further comprising sequences of instructions which when executed using the one or more processors cause the one or more processors to perform the operations of:

obtaining, via an input using a widget of a graphical user interface, all of the maximum allowed distance value; a maximum allowed unit level value; a maximum allowed number of branches; and a maximum allowed group data total; and using the maximum allowed distance value in a step of determining the shortest physical distance, using the maximum allowed unit level value in a step of determining whether the particular channel can accept the one or more shortest potential new branches, using the maximum allowed number of branches in a step of finding the one or more shortest potential new branches, and using the maximum allowed group data total that was obtained via the input using the widget of the graphical user interface in a step of creating the new Constructal group.

13. The one or more non-transitory computer-readable storage media of claim 10, the digitally stored map data representing a plurality of different Zip code values corresponding to a plurality of United States Zip codes; and the digitally stored metric data specifying a plurality of integer data values, each of the plurality of integer data values corresponding to one of the plurality of different Zip code values, and each of the plurality of integer data values specifying a number of business entities of a specified type that are within corresponding Zip code values.

14. The one or more non-transitory computer-readable storage media of claim 10, further comprising sequences of instructions which when executed using the one or more processors cause the one or more processors to perform the operations of: causing generating a digital graphical visual display of the territory data on a display device of a user computer that is communicatively coupled via a network.

15. The one or more non-transitory computer-readable storage media of claim 10, the two or more territory definitions of the territory data each being associated with a different set of one or more identifiers of incentive compensated sales representatives, wherein the one or more sequences of instructions which when executed using the one or more processors further cause the one or more processors to perform the operations of: transmitting the territory data to an incentive sales calculation application.

16. The one or more non-transitory computer-readable storage media of claim 10, the digitally stored map data defining a geographic map of a physical region of Earth and comprising the plurality of geographic units.

17. The computer-implemented method of claim 1, wherein the metric data comprises one or more of a number of customers, a number of accounts, a number of product installations, a number of business entities, or population.

18. The one or more non-transitory computer-readable storage media of claim 9, wherein the metric data comprises one or more of a number of customers, a number of accounts, a number of product installations, a number of business entities, or population.

* * * * *